United States Patent
Sauer et al.

(10) Patent No.: US 11,622,165 B2
(45) Date of Patent: *Apr. 4, 2023

(54) VEHICULAR CAMERA ASSEMBLY WITH ELECTRICAL CONNECTORS

(71) Applicant: MAGNA ELECTRONICS INC., Auburn Hills, MI (US)

(72) Inventors: Stefan Sauer, Waldaschaff (DE); Marc Sigle, Alzenau (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/448,949

(22) Filed: Sep. 27, 2021

(65) Prior Publication Data

US 2022/0014651 A1  Jan. 13, 2022

Related U.S. Application Data

(63) Continuation of application No. 16/852,661, filed on Apr. 20, 2020, now Pat. No. 11,134,183, which is a
(Continued)

(51) Int. Cl.
*H04N 7/18* (2006.01)
*H04N 23/51* (2023.01)
*H04N 23/54* (2023.01)
*H04N 23/55* (2023.01)
*H04N 23/57* (2023.01)
(Continued)

(52) U.S. Cl.
CPC .............. *H04N 23/51* (2023.01); *B60R 1/00* (2013.01); *B60R 1/04* (2013.01); *B60R 1/12* (2013.01); *H04N 23/54* (2023.01); *H04N 23/55* (2023.01); *H04N 23/57* (2023.01); *B60R 2001/1253* (2013.01); *B60R 2300/8026* (2013.01)

(58) Field of Classification Search
CPC .... B60R 1/00; B60R 1/04; B60R 1/12; B60R 2001/1253; B60R 2300/8026; H04N 5/2252; H04N 5/2253; H04N 5/2254; H04N 5/2257
See application file for complete search history.

(56) References Cited

U.S. PATENT DOCUMENTS 5,550,677 A   8/1996   Schofield et al.
5,670,935 A   9/1997   Schofield et al.
(Continued)

*Primary Examiner* — Md N Haque
(74) *Attorney, Agent, or Firm* — Honigman LLP

(57) ABSTRACT

A vehicular camera assembly includes a camera housing having a front housing portion and a rear housing portion. The front housing portion accommodates a lens. A first printed circuit board (PCB) is disposed at the front housing portion, with an imager disposed at a front side of the first PCB and a first electrical connector disposed at a rear side of the first PCB. A second PCB has a second electrical connector disposed at a front side. Circuitry of the second PCB is electrically connected to circuitry of the first PCB via electrical connection of the first and second electrical connectors. A plurality of terminal pins has a first end interior the camera housing and a second end at a connector portion of the rear housing portion. The connector portion is configured for connecting to a vehicle wiring connector when the vehicular camera assembly is installed at a vehicle.

20 Claims, 37 Drawing Sheets

Related U.S. Application Data continuation of application No. 15/416,220, filed on Jan. 26, 2017, now Pat. No. 10,630,872, which is a continuation of application No. 13/785,099, filed on Mar. 5, 2013, now Pat. No. 9,565,342.

(60) Provisional application No. 61/745,925, filed on Dec. 26, 2012, provisional application No. 61/735,314, filed on Dec. 10, 2012, provisional application No. 61/607,229, filed on Mar. 6, 2012.

(51) Int. Cl.
  *B60R 1/00* (2022.01)
  *B60R 1/04* (2006.01)
  *B60R 1/12* (2006.01)

(56) References Cited

U.S. PATENT DOCUMENTS

| | | | |
|---|---|---|---|
| 5,949,331 A | 9/1999 | Schofield et al. | |
| 6,222,447 B1 | 4/2001 | Schofield et al. | |
| 6,498,620 B2 | 12/2002 | Schofield et al. | |
| 6,605,775 B1 | 8/2003 | Seeber et al. | |
| 6,611,202 B2 | 8/2003 | Schofield et al. | |
| 6,636,258 B2 | 10/2003 | Strumolo | |
| 7,145,519 B2 | 12/2006 | Takahashi et al. | |
| 7,161,616 B1 | 1/2007 | Okamoto et al. | |
| 7,230,640 B2 | 6/2007 | Regensburger et al. | |
| 7,248,283 B2 | 7/2007 | Takagi et al. | |
| 7,295,229 B2 | 11/2007 | Kumata et al. | |
| 7,301,466 B2 | 11/2007 | Asai | |
| 7,381,089 B2 | 6/2008 | Hosler, Sr. | |
| 7,492,262 B2 | 2/2009 | Washington | |
| 7,592,928 B2 | 9/2009 | Chinomi et al. | |
| 7,859,565 B2 | 12/2010 | Schofield et al. | |
| 8,194,132 B2 | 6/2012 | Dayan et al. | |
| 8,520,070 B1 | 8/2013 | Englander et al. | |
| 8,866,907 B2 | 10/2014 | McElroy et al. | |
| 9,041,806 B2 | 5/2015 | Baur et al. | |
| 9,319,639 B1 * | 4/2016 | Englander | B60R 1/04 |
| 9,565,342 B2 | 2/2017 | Sauer et al. | |
| 10,630,872 B2 | 4/2020 | Sauer et al. | |
| 11,134,183 B2 | 9/2021 | Sauer et al. | |
| 2003/0117728 A1 * | 6/2003 | Hutzel | B60R 1/12 359/850 |
| 2006/0171704 A1 * | 8/2006 | Bingle | B60S 1/56 396/419 |
| 2006/0212624 A1 | 9/2006 | Kim | |
| 2006/0254805 A1 | 11/2006 | Scherer et al. | |
| 2009/0244361 A1 | 10/2009 | Gebauer et al. | |
| 2010/0097519 A1 | 4/2010 | Byrne et al. | |
| 2010/0118145 A1 | 5/2010 | Betham et al. | |
| 2011/0310248 A1 * | 12/2011 | McElroy | H04N 23/55 348/148 |
| 2012/0062743 A1 | 3/2012 | Lynam et al. | |
| 2012/0154591 A1 | 6/2012 | Baur et al. | |
| 2013/0222595 A1 | 8/2013 | Gebauer et al. | |
| 2013/0314503 A1 | 11/2013 | Nix et al. | |
| 2013/0328672 A1 | 12/2013 | Sesti et al. | |
| 2014/0022390 A1 | 1/2014 | Blank et al. | |
| 2014/0138140 A1 | 5/2014 | Sigle | |
| 2014/0152778 A1 | 6/2014 | Ihlenburg et al. | |
| 2014/0218535 A1 | 8/2014 | Ihlenburg et al. | |
| 2014/0247355 A1 | 9/2014 | Ihlenburg | |
| 2014/0313339 A1 | 10/2014 | Diessner | |
| 2014/0340510 A1 | 11/2014 | Ihlenburg et al. | |
| 2014/0354878 A1 | 12/2014 | Winter et al. | |

\* cited by examiner

| PART NO. | UFL-LP-066 |
|---|---|
| MATED HEIGHT | 2.5mm MAX. (2.4mm NOM.) |
| APPLICABLE CABLE | DIA. 1.13mm AND DIA. 1.32mm COAXIAL CABLE |
| WEIGHT (mg) | 59.1 |

③ CABLE TYPE

04 : DIA. 0.81mm COAXIAL CABLE
068 : DIA. 1.13mm COAXIAL CABLE
066 : DIA. 1.32mm COAXIAL CABLE
062 : DIA. 1mm COAXIAL CABLE
088 : DIA. 1.37mm COAXIAL CABLE

FIG. 26

U.FL SERIES○ULTRA SMALL SURFACE MOUNT COAXIAL CONNECTORS - 1.9mm OR 2.4mm MATED HEIGHT

☐ PRODUCT SPECIFICATIONS

| RATINGS | NOMINAL CHARACTERISTIC IMPEDANCE | 50 OHMS | OPERATING TEMPERATURE RANGE | -40°C TO +90°C | STORAGE TEMPERATURE RANGE | -30°C TO +70°C |
|---|---|---|---|---|---|---|
| | FREQUENCY RANGE | DC TO 6GHz | OPERATING HUMIDITY | 90%RH MAX. | STORAGE HUMIDITY | 90%RH MAX. |

| ITEM | SPECIFICATION | CONDITIONS | | |
|---|---|---|---|---|
| 1. CONTACT RESISTANCE | CENTER : 20 m OHMS MAX.<br>OUTER : 10 m OHMS MAX. | 10 mA MAX. | | |
| 2. INSULATION RESISTANCE | 500 m OHMS MIN. | 100 V DC | | |
| 3. WITHSTANDING VOLTAGE | NO FLASHOVER OR INSULATION BREAKDOWN. | 200 V AC / 1 MINUTE | | |
| 4. V.S.W.R.* | PART NO | | UP TO 3GHz | 3 TO 6GHz |
| | U.FL-LP-040 DIA.0.81mm COAXIAL CABLE ASSEMBLY | | 1.3 MAX | 1.35 MAX |
| | U.FL-LP(V)-040 DIA.0.81mm COAXIAL CABLE ASSEMBLY | | 1.3 MAX | 1.3 MAX |
| | U.FL-LP-066 DIA.1.13mm COAXIAL CABLE ASSEMBLY | | 1.3 MAX | 1.4 MAX |
| | U.FL-LP-066 DIA.1.32mm COAXIAL CABLE ASSEMBLY | | 1.3 MAX | 1.5 MAX |
| | U.FL-LP-062 DIA.1mm COAXIAL CABLE ASSEMBLY | | 1.3 MAX | 1.3 MAX |
| | U.FL-LP-088 DIA.1.37mm COAXIAL CABLE ASSEMBLY | | 1.3 MAX | 1.4 MAX |
| 5. DURABILITY (MATING / UN-MATING, WITH CORRESPONDING PLUG) | CONTACT RESISTANCE<br>CENTER : 25 m OHMS MAX.<br>OUTER : 15 m OHMS MAX. | 30 CYCLES | | |
| 6. VIBRATION | NO ELECTRICAL DISCONTINUITY OF 1μs MIN.<br>NO DAMAGE, CRACKS OR PARTS DISLOCATION. | FREQUENCY: 10 TO 100 Hz, SINGLE AMPLITUDE OF 1.5mm, ACCELERATION OF 59m/s², FOR 5 CYCLES IN THE DIRECTION OF EACH OF THE 3 AXIS. | | |
| 7. SHOCK | | ACCELERATION OF 735 m/s², 11ms DURATION, SINE HALF-WAVE WAVEFORM, 3 CYCLES IN EACH OF 3 AXES. | | |
| 8. HUMIDITY (STEADY STATE) | NO DAMAGE, CRACKS OR PARTS DISLOCATION.<br>INSULATION RESISTANCE 10 m OHMS MIN.(HUMIDITY HIGH) INSULATION RESISTANCE 500 m OHMS MIN.(DRY) | 96 HOURS AT TEMPERATURE OF 40°C AND HUMIDITY OF 95% | | |
| 7. TEMPERATURE CYCLE | NO DAMAGE, CRACKS OR PARTS DISLOCATION.<br>CONTACT RESISTANCE: 25 m OHMS MAX. (CENTER)<br>15 m OHMS MAX. (OUTER) | TEMPERATURE: -40°C→+5 TO +35°C→+90°C→+5 TO +35°C<br>TIME: 30MIN.→ 3MIN.→ 30MIN.→ 3MIN.<br>5 CYCLES | | |
| 10. SALT SPRAY | NO EXCESSIVE CORROSION | 5% SALT WATER SOLUTION, 48 HOURS | | |

*V.S.W.R. MEASUREMENT SYSTEM
THE ABOVE V.S.W.R. STANDARD VALUES WERE MEASURED USING THE MEASUREMENT CONNECTION SHOWN BELOW.

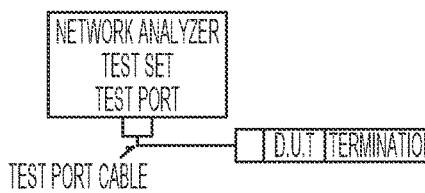

NOTE 1: CABLE TYPE CONNECTORS WERE MEASURED WITH SMA CONVERSION ADAPTERS ATTACHED TO BOTH ENDS OF THE HARNESS PRODUCT OF A SUITABLE 100cm CABLE.
NOTE2: BOARD TYPE CONNECTORS WERE MOUNTED TO A 50Ω GLASS EPOXY BOARD AND MEASUREMENTS WERE CONDUCTED WITH SMA CONVERSION ADAPTERS ATTACHED.

☐ MATERIAL/FINISHES

| PART | MATERIAL | | FINISH | REMARKS |
|---|---|---|---|---|
| SHELL | PHOSPHOR BRONZE | | SILVER PLATED | ——— |
| MALE CENTER CONTACT | BRASS | | GOLD PLATED | ——— |
| FEMALE CENTER CONTACT | PHOSPHOR BRONZE | | GOLD PLATED | ——— |
| INSULATOR | PLUG | PBT | COLOR: BLACK | UL94V-0 |
| | RECEPTACLE | LCP | COLOR: BEIGE | UL94V-0 |

FIG. 27

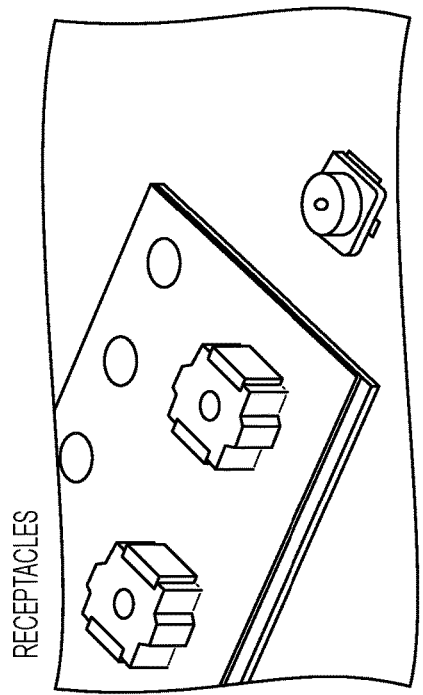
FIG. 28A
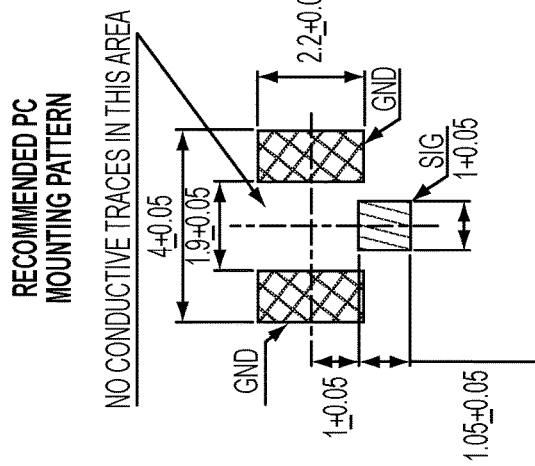
FIG. 28F
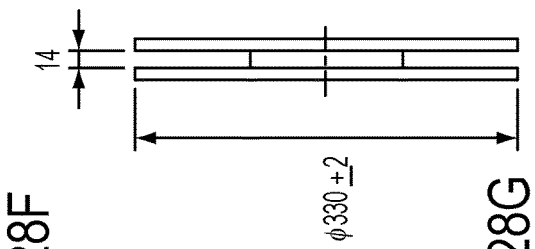
FIG. 28G
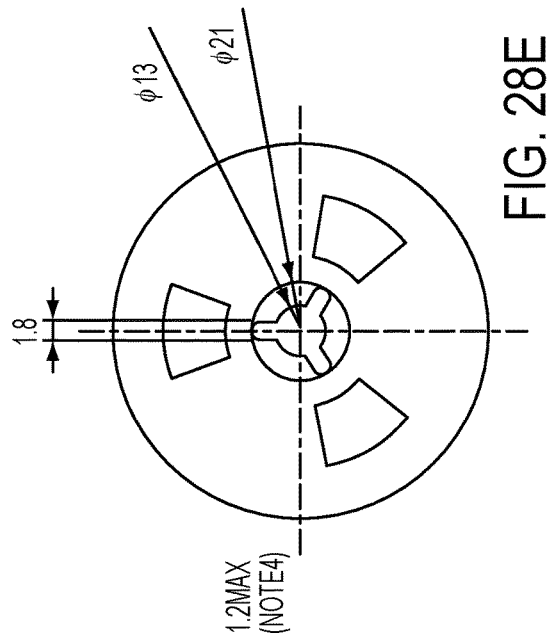
FIG. 28E
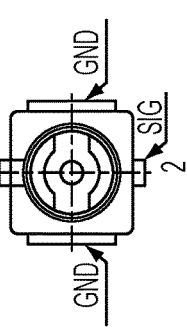
FIG. 28B
FIG. 28C
FIG. 28D

JAE ORIGINAL CONNECTORS

| |
|---|
| CV10 |
| 50Ω |
| DC TO 3GHz |
| PUSH-ON |
| 0.8D EQUIVALENT (SPECIAL) |
|  |
| 500 VAC rms (1 MINUTE) |
| 500 MEGOHMS MIN. |
| 30 MILLIOHMS MAX. |
| 15 MILLIOHMS MAX. |
| 1.3 MAX. (DC TO 3GHz) |
| 71 TO 74 |

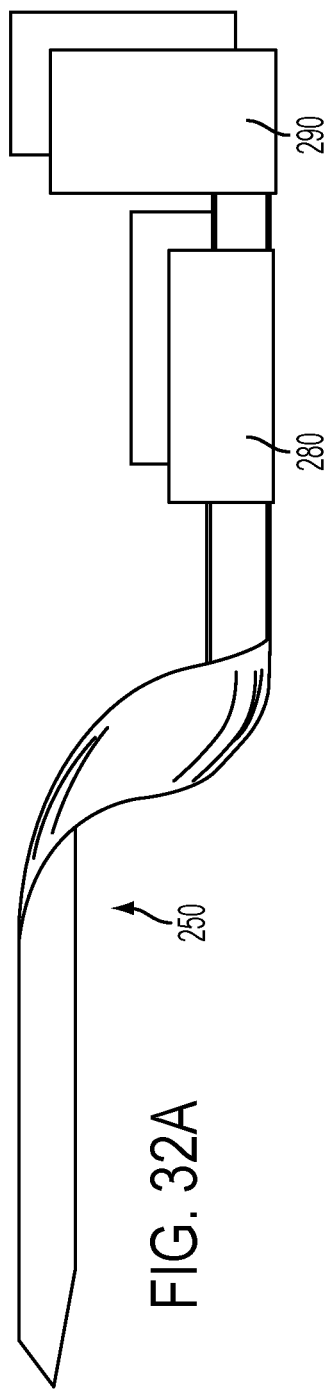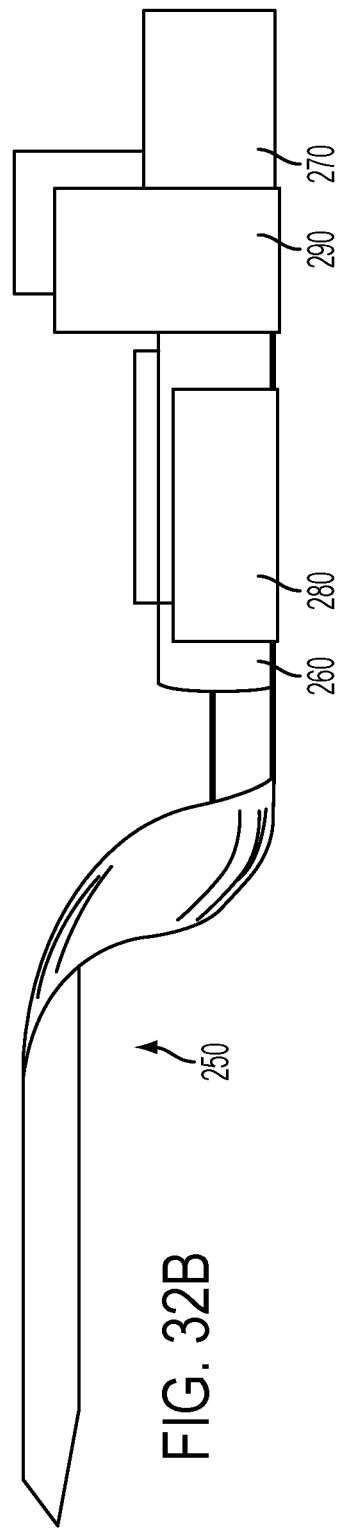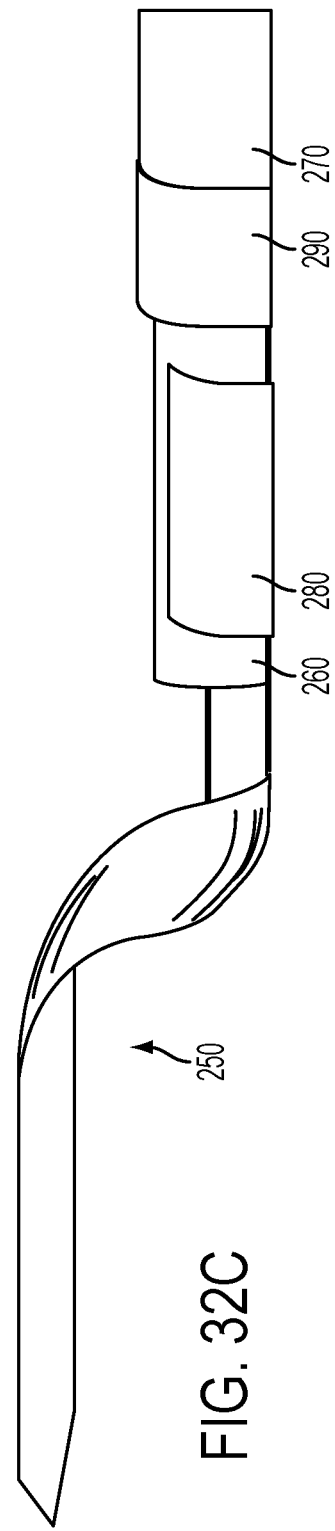

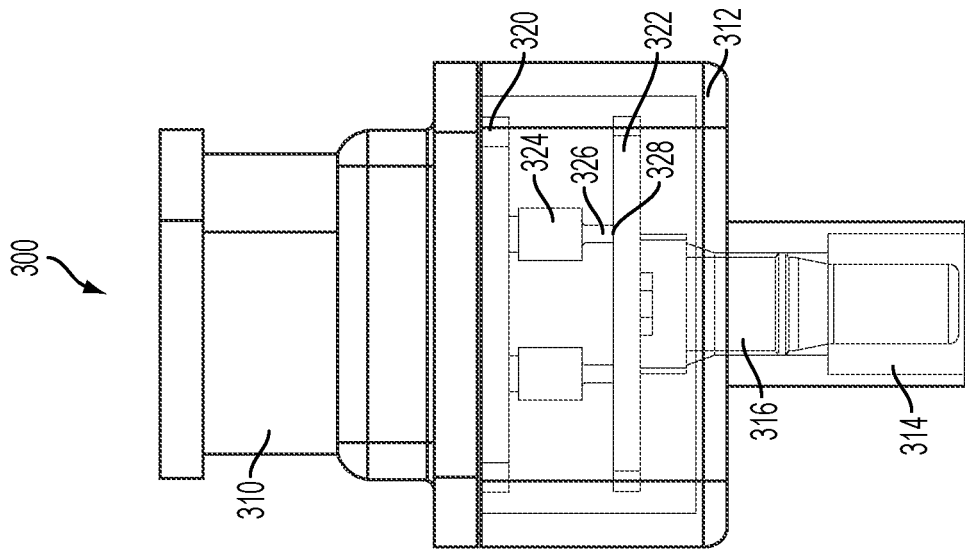
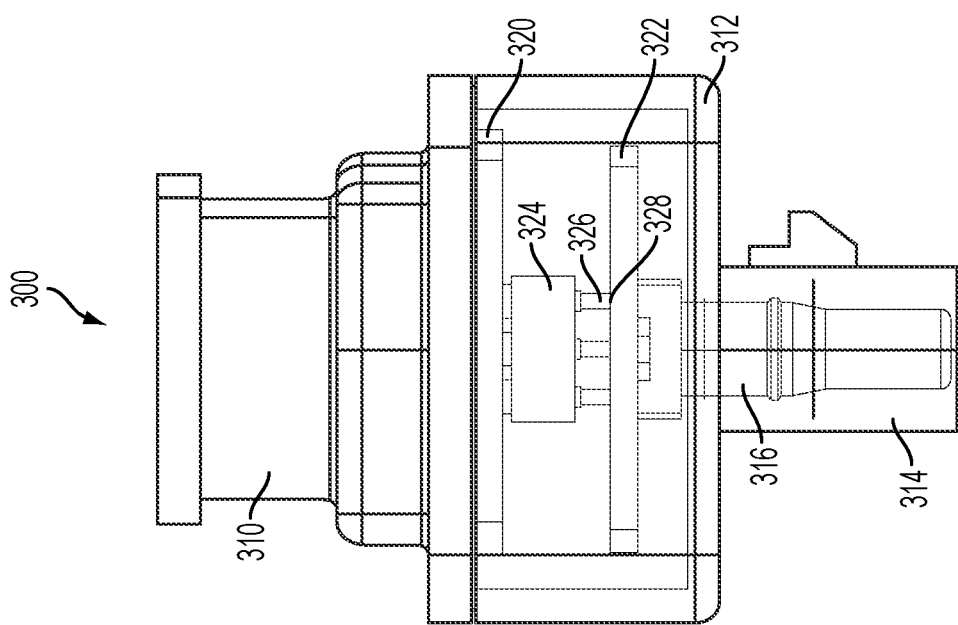

VEHICULAR CAMERA ASSEMBLY WITH ELECTRICAL CONNECTORS

CROSS REFERENCE TO RELATED APPLICATIONS

The present application is a continuation of U.S. patent application Ser. No. 16/852,661, filed Apr. 20, 2020, now U.S. Pat. No. 11,134,183, which is a continuation of U.S. patent application Ser. No. 15/416,220, filed Jan. 26, 2017, now U.S. Pat. No. 10,630,872, which is a continuation of U.S. patent application Ser. No. 13/785,099, filed Mar. 5, 2013, now U.S. Pat. No. 9,565,342, which claims the filing benefit of U.S. provisional applications, Ser. No. 61/745,925, filed Dec. 26, 2012, Ser. No. 61/735,314, filed Dec. 10, 2012, and Ser. No. 61/607,229, filed Mar. 6, 2012, which are hereby incorporated herein by reference in their entireties.

FIELD OF THE INVENTION

The present invention relates to imaging systems or vision systems for vehicles.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a camera for a vehicle vision system, with the camera providing enhanced electrical connection between terminals of a connector of the camera (that are electrically connected to a vehicle wiring or lead when the camera is mounted at a vehicle) and circuitry of a circuit element (such as a printed circuit board (PCB) or the like) within the housing of the camera.

According to an aspect of the present invention, a camera for a vehicle vision system includes a housing (which may comprise a first housing portion and a second housing portion, with the first housing portion having a lens holder for holding a lens therein) having a connector portion for connecting to a vehicle wiring when the camera is installed at a vehicle. A circuit element is disposed within the housing, and a plurality of electrical connector elements are disposed at the connector portion of the housing. The electrical connector elements includes first ends that are configured for electrically connecting to circuitry of the circuit element and second ends that are configured for electrically connecting to the vehicle wiring. The electrical connector elements self-adjust to engage the circuitry and maintain engagement with the circuitry during assembly of the camera housing and during use of the camera on a vehicle. The self-adjustment of the electrical connector elements comprises at least one of (i) extending toward an extended state, (ii) retracting toward a retracted state, and (iii) flexing toward a flexed state.

Therefore, the present invention provides a vehicle vision system camera that has enhanced electrical connection between an electrical wiring or lead of the vehicle that connects to terminals or pins of a camera connector and to circuitry of an imager PCB or the like. The enhanced electrical connection is provided via an adjustable or self-adjusting electrical connector, such as a spring-loaded pin or connector or a flexible or resilient connector, with the connector elements self-adjusting or moving or flexing to maintain alignment and electrical connection between the connector portion of the camera housing and the circuitry of the imager PCB or other circuitry within the camera housing. The present invention thus enhances the manufacturing of the camera module (and assembling of the first and second housing portions together), such as by readily adjusting or adapting for tolerance variations and misalignments or slight misalignments of the housing portions and camera components, and provides enhanced electrical connection over the life time of the camera.

These and other objects, advantages, purposes and features of the present invention will become apparent upon review of the following specification in conjunction with the drawings.

BRIEF DESCRIPTION OF THE DRAWINGS

FIG. 26 is an exemplary data sheet of such a round shape coaxial connector as being used as the PCB connector (50) of FIG. 24, with the rated maximal frequency in MHz, which qualifies the connector for being used for uncompressed single Megapixel camera LVDS data transmission;

FIG. 27 is an exemplary data sheet of such a SMD pole as being used as the PCB pole (60) of FIG. 24;

FIGS. 28A-G and 29 are other exemplary data sheets of such a round shape connector as being used as the PCB connector (50) of FIG. 24 similar to the connector shown in FIG. 26;

FIGS. 32A-C are views of a cable connector with flexible properties that are suitable for use at the connector harness side (counter connector) when connecting to or contacting the camera of FIG. 31, in accordance with the present invention;

FIG. 34A is a semi-transparent side view of the automotive vision system camera of FIG. 33A from one side (same side as the view in FIG. 33A);

FIG. 34B is a semi-transparent side view of the automotive vision system camera of FIG. 33A from a second, 90 degrees turned side as compared to FIG. 34A;

Figure 1:
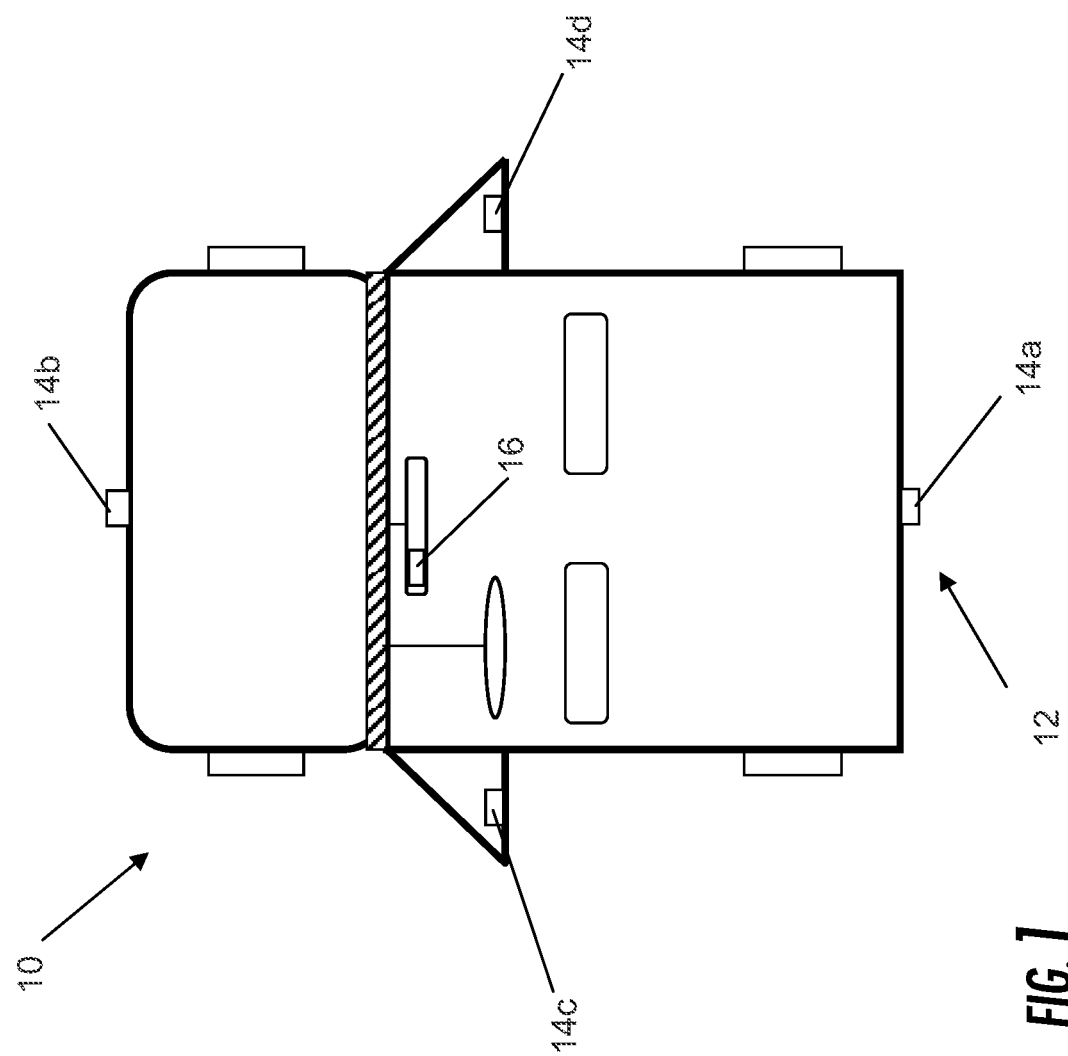
FIG. 1 is a plan view of a vehicle with a vision system and imaging sensors or cameras that provide exterior fields of view in accordance with the present invention.

LEGEND 20 sheathing
21 shielding foil (AL)
22 shielding meshwork (out of metal)
23 dielectric coax layer
24 inside camera housing coax core wire
25 coaxial connector inner pin (metal) in combination with an inset housing connector fork
26 coaxial connector outer (tube shape) contour (out of metal)
27 scissor contact edges
30 coaxial cable 40 coaxial connector outside contour
41 coaxial connector inside contour
50 coaxial plug—round shaped
51 coaxial plug—square shaped
60 coaxial pole—round shaped, SMD
61 coaxial pole square shaped, SMD or THT
70 PCB
80 pull relief
90 Camera housing bottom structure
96 lens module components
100 Cable dome
110 cable tamping/sealing
120 Lid
125 Lid clips
130 flexible wires
140 board connector
150 board connector socket
160 fixation point
170 Peripheral camera connector
180 Cable
200 connectors sheathing
210 Interconnectors crimp elements (metal)
250 cable shoe (single wire)
260 core wire
270 cable's sheathing
280 core clamps
290 sheathing clamps
300 camera or camera module
310 lens module
312 housing/bottom structure
314 outer connector structure
316 coaxial connector
318 imager
320 imager PCB
322 connector PCB
324 spring connector block
326 spring-loaded connectors
328 contact pads
330 elastic sealing structure

DESCRIPTION OF THE PREFERRED EMBODIMENTS

A driver assist system and/or vision system and/or object detection system and/or alert system may operate to capture images or detect objects exterior of the vehicle and process the captured data to detect objects in front of the vehicle and in the predicted path of the vehicle, such as to alert the driver of the vehicle if there is insufficient clearance above the vehicle to the detected object. The object detection may utilize detection and analysis of moving vectors representative of objects detected in the field of view of the vehicle camera, in order to determine which detected objects are objects of interest to the driver of the vehicle.

Referring now to the drawings and the illustrative embodiments depicted therein, a vehicle 10 includes a sensing system or imaging system or vision system 12 that includes one or more imaging sensors or cameras (such as a rearward facing imaging sensor or camera 14a and/or a forwardly facing camera 14b at the front of the vehicle, and/or a sidewardly/rearwardly facing camera 14c, 14b at the sides of the vehicle), which capture images exterior of the vehicle, with the cameras having a lens for focusing images at or onto an imaging array or imaging plane of the camera (FIG. 1). The sensing system 12 is operable to process image data captured by the forward facing sensor and may provide displayed images at a display device 16 for viewing by the driver of the vehicle. The sensing system processes captured data to detect objects, such as objects forward of the vehicle during forward driving or such as objects to the rear of the subject or equipped vehicle during a reversing maneuver, and includes a camera or camera module that has enhanced electrical connections within the camera housing, as discussed below.

Vehicle vision systems include cameras that are typically assembled out of a tube shape structure in which the lens system is fitted, commonly referred to as a lens holder, and at which end the imager chip is aligned. The camera includes a bottom structure or lid that typically carries the camera connector (an exemplary camera or camera module is shown in FIGS. 2 and 3).

Figure 2:
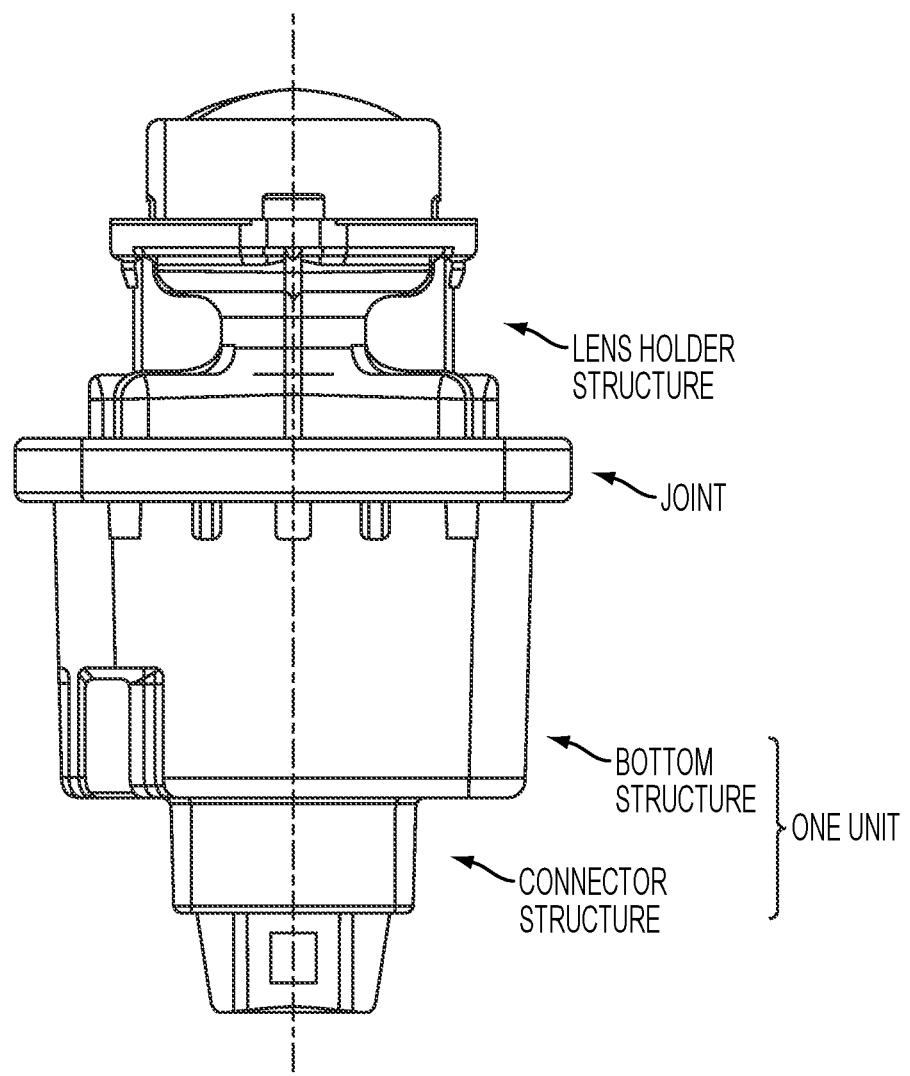
FIG. 2 is a side elevation of an automotive vision system camera, fully assembled, with two main units that are joined or united during assembly, and with the lens holder structure joined to the bottom structure, which is united with a connector structure or assembly.
Figure 3:
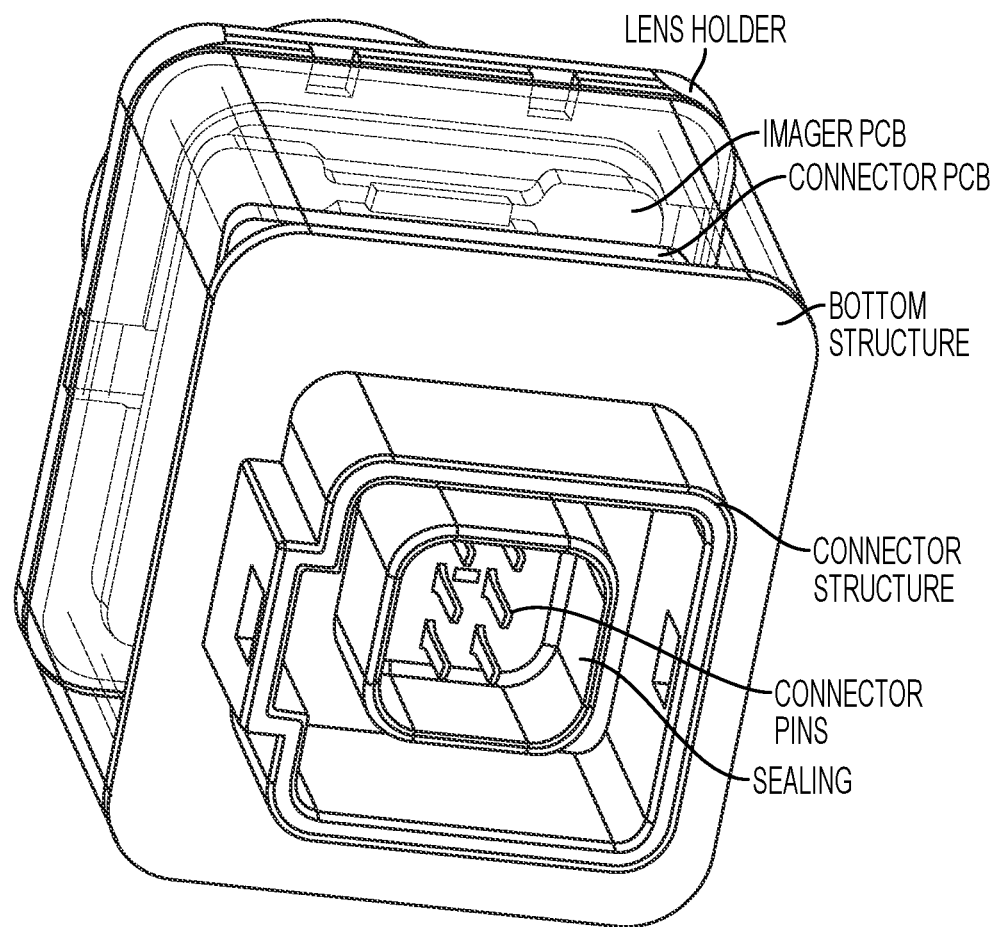
FIG. 3 is a perspective view of a camera similar to the camera of FIG. 2, shown with semi-transparent side walls and having a different connector structure compared to the camera of FIG. 2.

For example, with reference to FIG. 2, an automotive vision system camera, fully assembled, includes two main units that are joined or united during assembly, with the lens holder structure joined to the bottom structure. The bottom structure is connected or united with a connector structure or assembly. Optionally, and as shown in FIG. 3, a camera may have a different connector structure compared to that of FIG. 2, with the connector's functional contours assembled in a single unit with the bottom structure. A sealing may be provided or assembled for tightening the connectors inside when connected to a counter connector. In the illustrated embodiment, the connector pins reach from the inside of the camera into the connector's region. The connector portion of the camera is configured to connect to a corresponding multi-pin connector of a vehicle wiring harness or the like, such as a plug and socket type connection. In the illustrated embodiment, the connector portion is configured as a socket (with electrical connecting elements therein) that is configured to receive a correspondingly formed or contoured plug element (with electrical connecting elements therein) of the vehicle wiring harness.

The aligning of the lens holder to the imager or imaging array or chip and/or the imager or imaging array or chip carrying PCB has to be kept as steady as possible over the life time of the camera. Misalignment may lead to poor picture quality, which is dissatisfying for the customer. Because of this, a very careful calibration is necessary during assembly. The inner circuits are connected via hitched connectors to the image data sink. Attaching a connector structure which might also act as a camera's housing lid must not add mechanical load to the lens holder structure nor to the imager PCB, so as to not disturb the calibration. To avoid this, it is known to use Flex™ cable (flat band shape) between the imager PCB (or another PCB in between) and the connector structure or connector PCB, and/or to use similar kinds of easy bending flexible cable bands or PCBs which behave similar to Flex™ cable in terms of bending capability and force decoupling, such as Semi-Flex™, Yellow-Flex™, Starr-Flex™, Multi-Flex™ and the like.

Flex™ cable connections are relatively expansive, consume space in the camera housing and add design limitations. The present invention provides an enhanced system or technique to decouple the lens holder structure mechanically from influencers of the camera housing's bottom/connector structure—and connector forces applied from outside when plugging in or connecting the connectors.

In order to decouple the lens holder structure mechanically from influencers of the camera housing's bottom/connector structure due to tolerances, changes over lifetime or connector insertion forces applied to the pins, or the connector contour, the present invention provides a camera that does not decouple the commonly used connector PCB from the imager PCB. The camera of the present invention attaches the connector PCB quite stiff to the imager PCB, and uses flexible/elastic or unhitched pins for decoupling or to decouple the whole lens holder structure.

Optionally, and such as shown, for example, in FIGS. 33A-37B, the decoupling between the connector PCB 322 and the imager PCB 320 may be achieved by unhitched pins or connector elements or the like. For example, and with reference to FIGS. 33A-37B, an automotive vision system camera or camera module 300 of the present invention has a lens module 310 and a housing or bottom structure or portion 312, which may include an outer connector structure 314 for a coaxial connector 316. An imager 318 is disposed at an imager PCB 320. A connector PCB 322 is connected to the imager PCB 320 via spring-loaded connectors 326 assembled onto a spring connector block 324 at the imager PCB 320, with connecting contacts or contact pads 328 disposed at or assembled on the connector PCB 322, which also carries the coaxial connector structure 316 that extends or reaches or is accessible outside or exterior or outbound the camera housing 312. Optionally, the camera may include an elastic sealing element or structure 330 for tightening or clamping or compressing and sealing between the coaxial connector and the connector housing structure.

Figure 9:
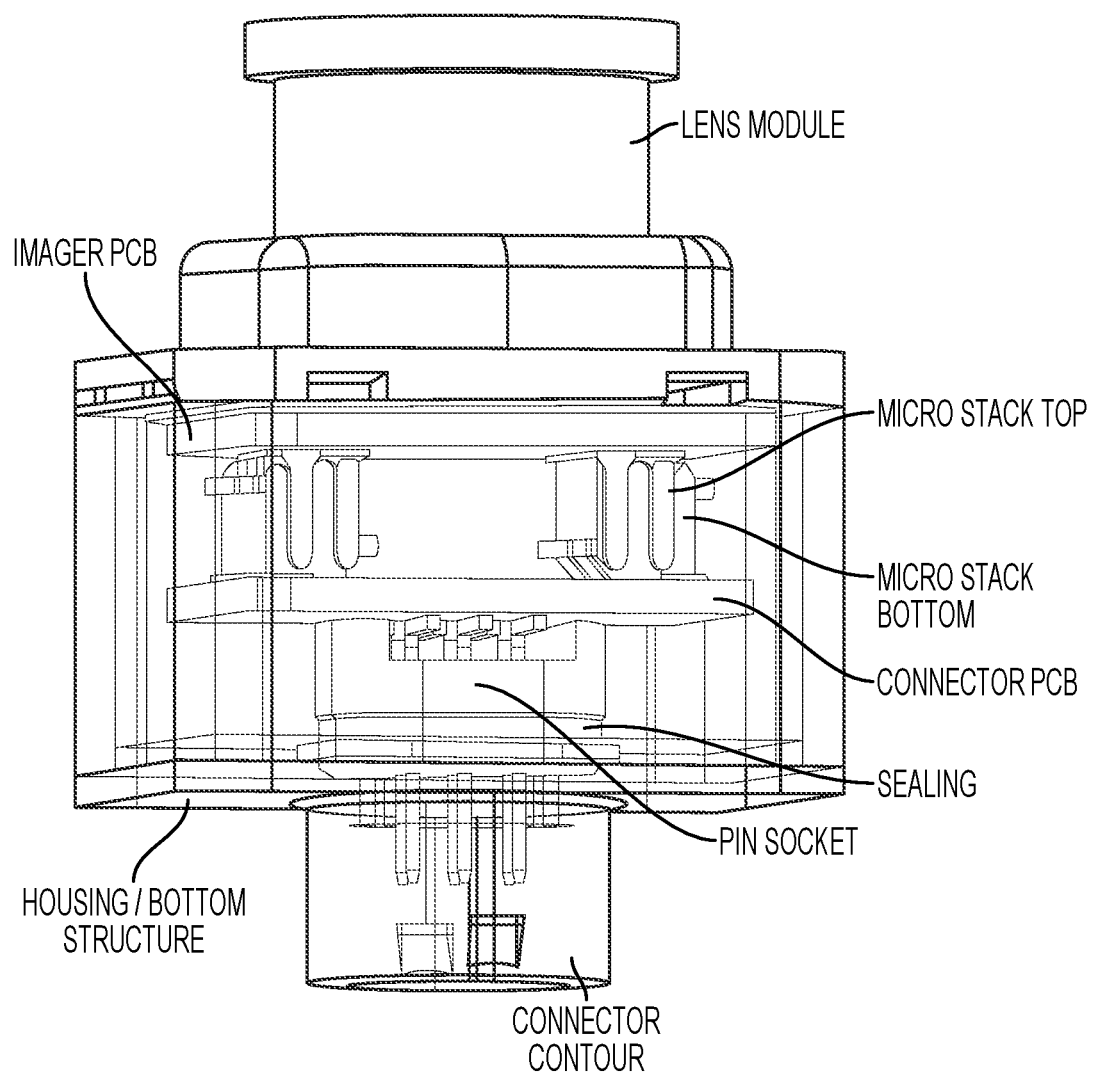
FIG. 9 is a side elevation (with a semi-transparent side wall) of an automotive vision system camera according to the present invention, shown with a floating structure having solid pins carried by a pin socket and being sealed by a sealing compound and a surrounding sealing which is flexible for tolerance movements in directions orthogonal to the optical axis.
Figure 10:
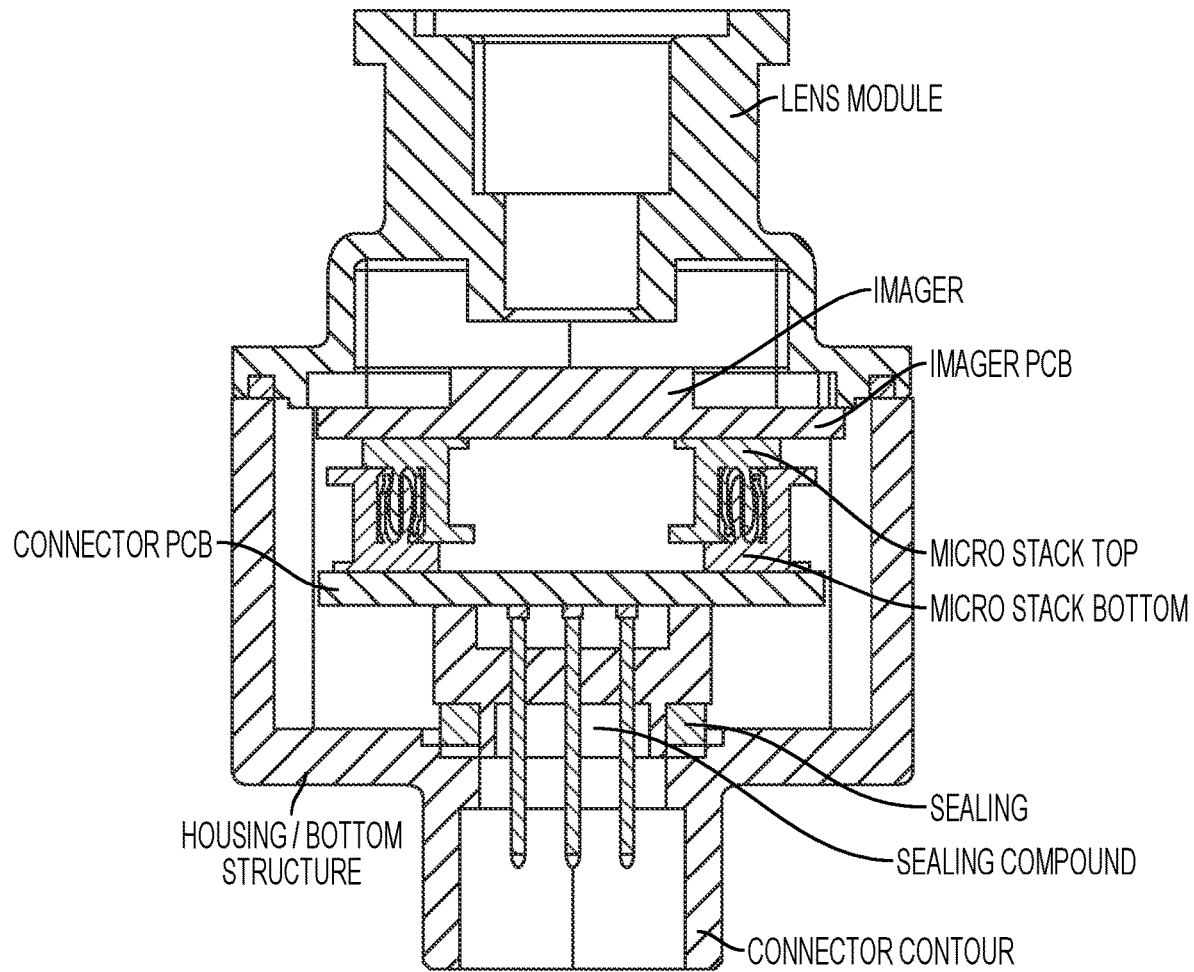
FIG. 10 is a sectional view of the camera of FIG. 9, showing the sealing compound and internal elements.

Optionally, the pins of a camera or camera module of the present invention may be fixed to the connector PCB and may comprise stiff needles. The pins are detached from the bottom structure floating within the connector structure (such as shown, for example, in FIGS. 9 and 10). For example, and as shown in FIGS. 9 and 10, an automotive vision system camera includes a floating structure having solid pins carried by a pin socket and sealed by a sealing compound and a surrounding sealing which is flexible for tolerance movements in directions orthogonal to the optical axis.

Optionally, in order to enable a low force floating of the lens holder image PCB and connector PCB structure against the outside connector—bottom structure, the sealings around the pins may be flexible and the connector insertion forces may be absorbed by the geometrics of connector contour, leading the forces exclusively to the bottom structure, not to the pins.

Figure 8A:
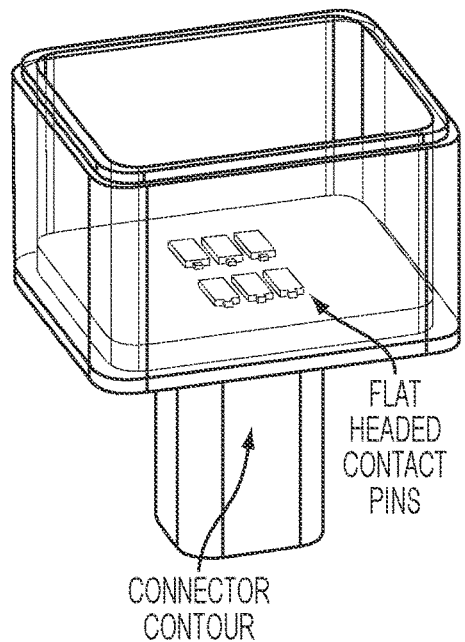
FIG. 8A is a perspective view of the automotive vision system camera's bottom structure (semi-transparent view) of FIG. 7, shown when the flat headed connector pins are assembled.
Figure 8B:
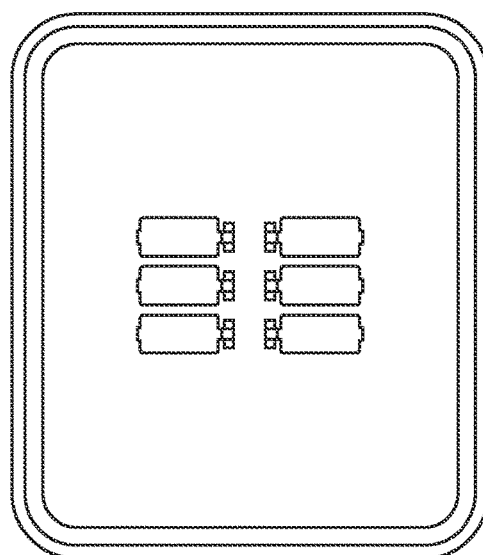
FIG. 8B is a top view of the automotive vision system camera's bottom structure (semi-transparent view) of FIG. 7, shown when the flat headed connector pins are assembled.
Figure 8C:
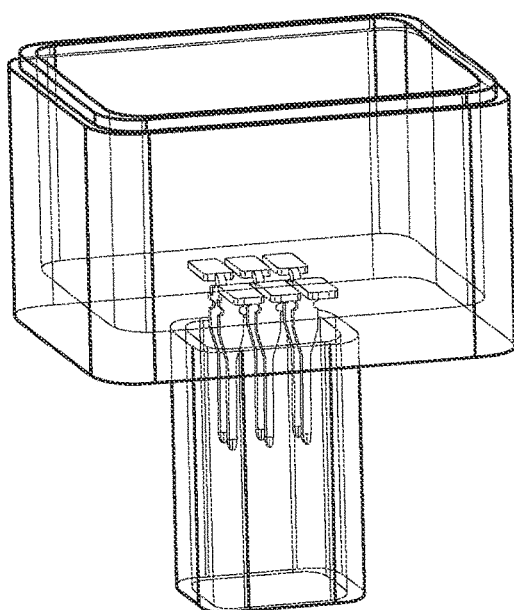
FIG. 8C is a perspective semi-transparent view of the automotive vision system camera's bottom structure (semi-transparent view) of FIG. 7, shown when the flat headed connector pins are assembled.
Figure 13:
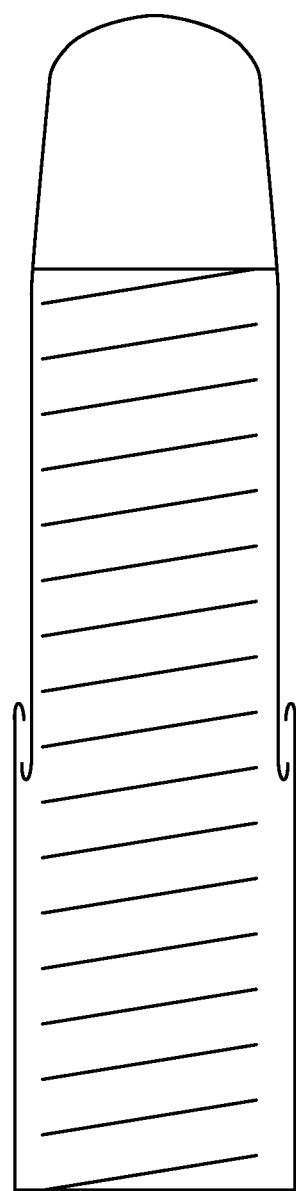
FIG. 13 is a functional schematic of a telescopic spring-loaded contact of the present invention, such as for the contacts shown in FIGS. 4-6.
Figure 14:
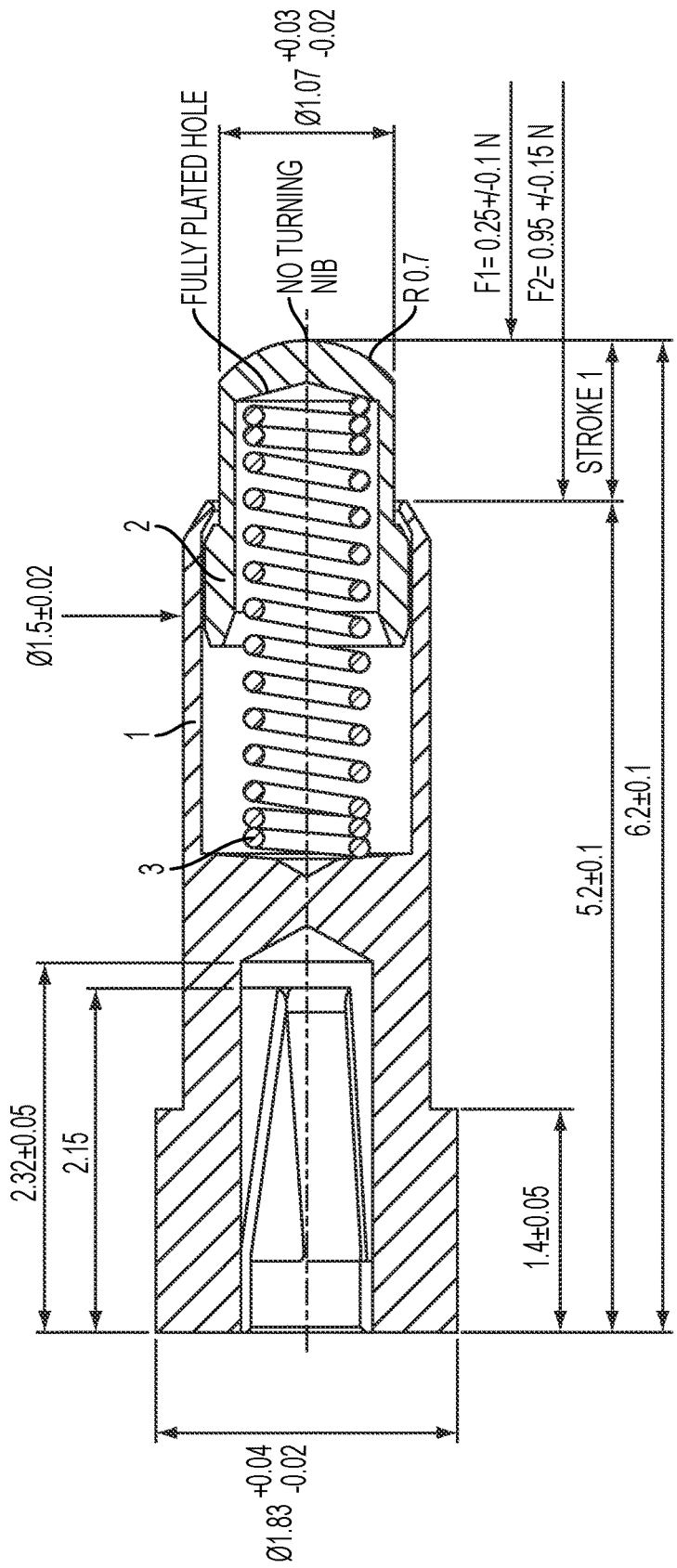
FIG. 14 is a drawing of a telescopic spring-loaded contact of the present invention, such as for the contacts shown in FIGS. 4-6 and 13, shown with typical dimensions and spring forces.
Figure 15:
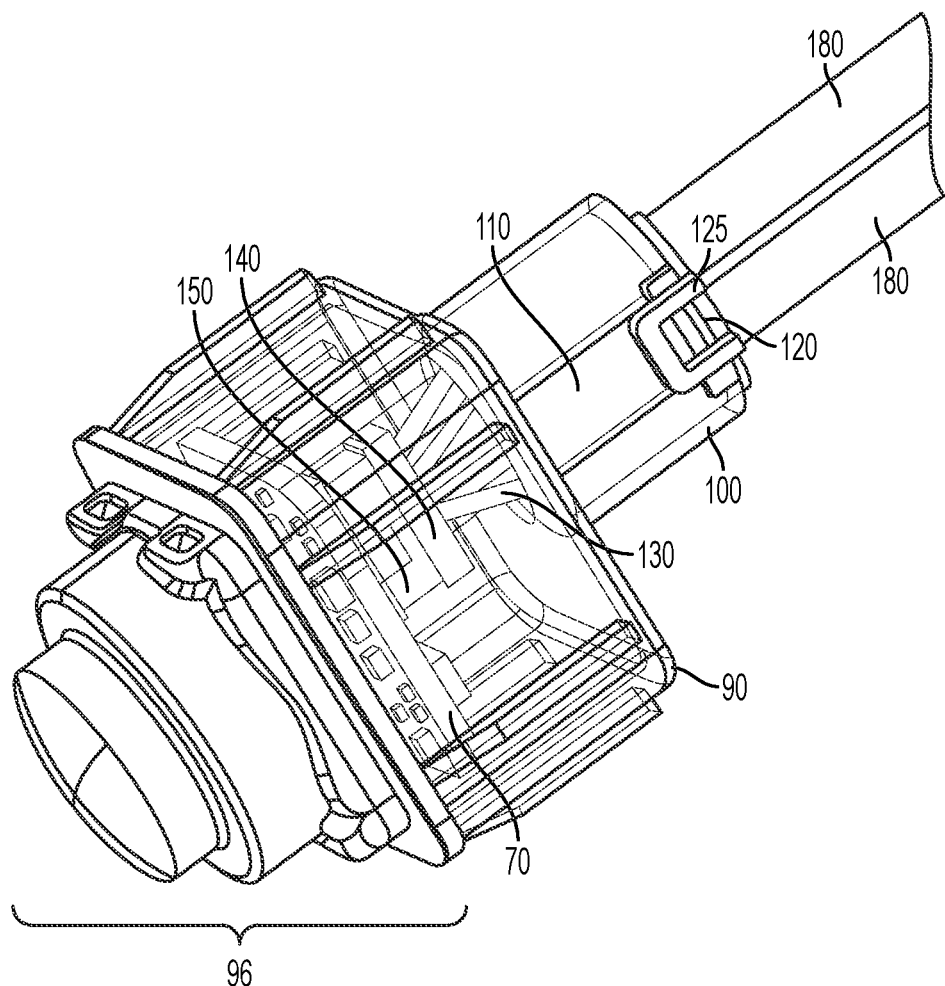
FIG. 15 is a semi-transparent perspective view of an automotive vision system camera of the present invention, showing a camera similar to the camera shown in FIG. 6, but with flexible wires leading to two outwarding cables (pigtail solution)
Figure 16:
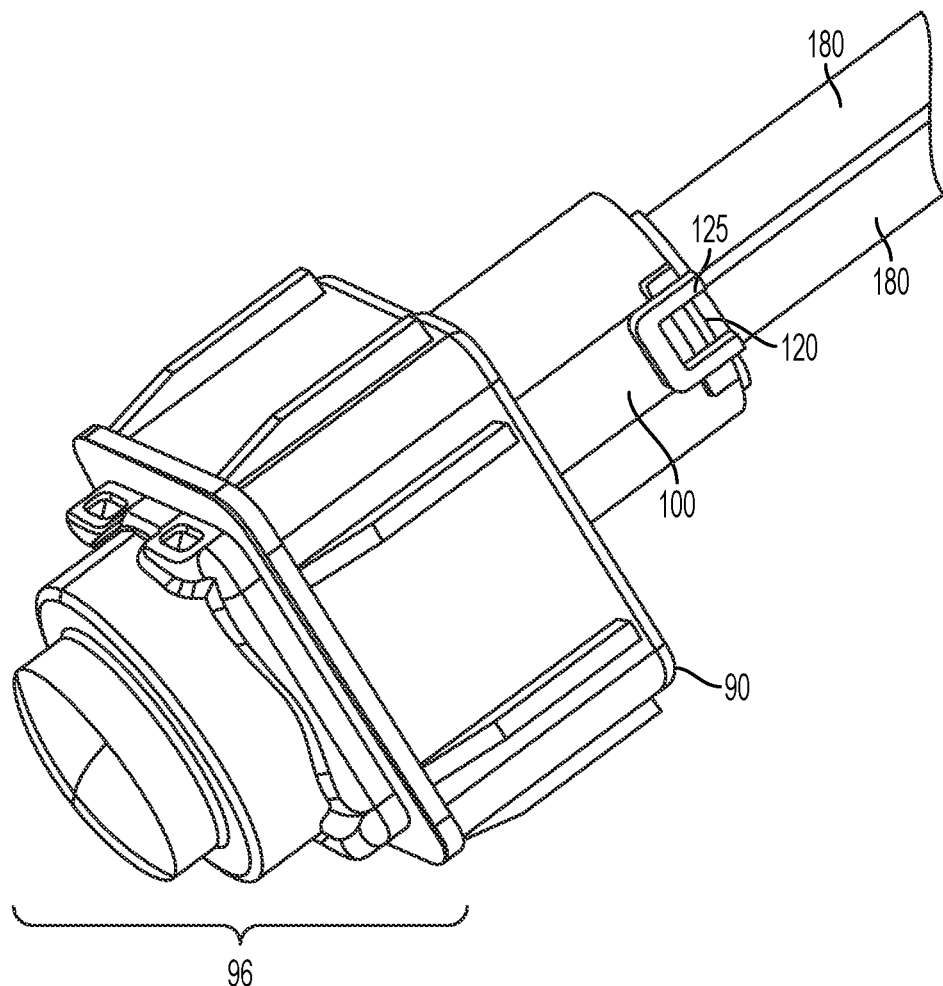
FIG. 16 is a solid perspective view of the automotive vision system camera shown in FIG. 15.
Figure 17:
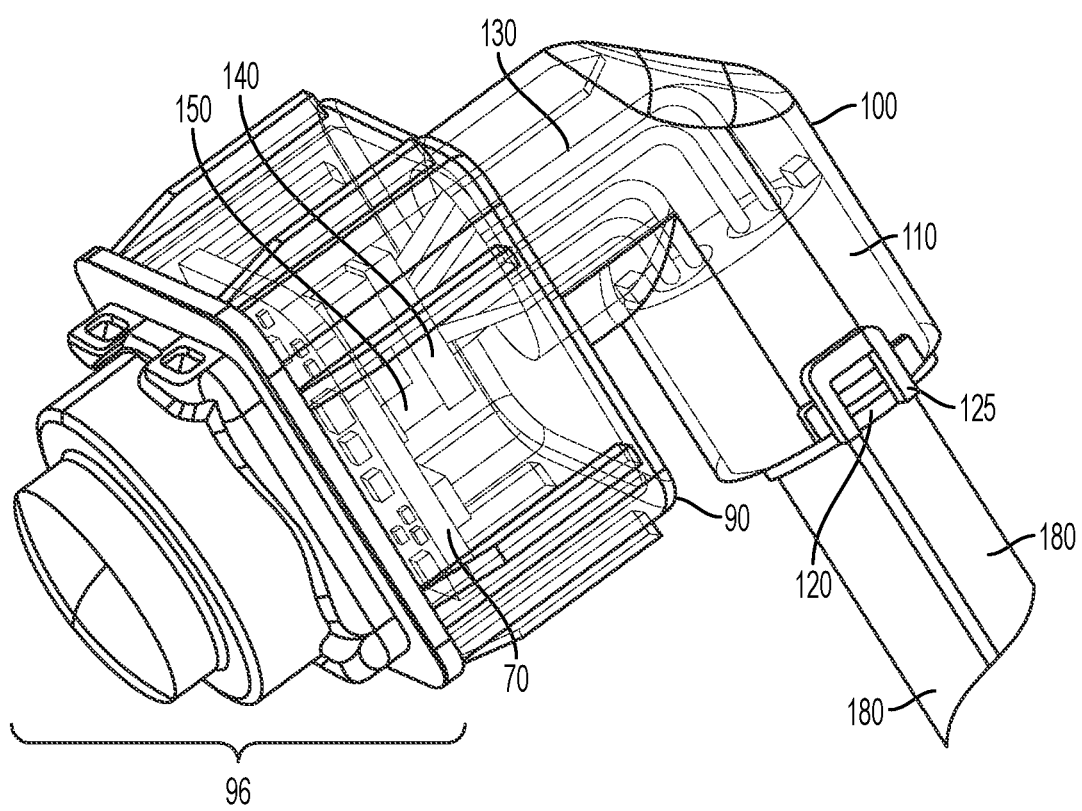
FIG. 17 is a semi-transparent perspective view of an automotive vision system camera of the present invention, showing a camera similar to the camera shown in FIG. 15, but with an angled cable dome through which the flexible wires become lead until flowing into two outwarding cables.
Figure 18:
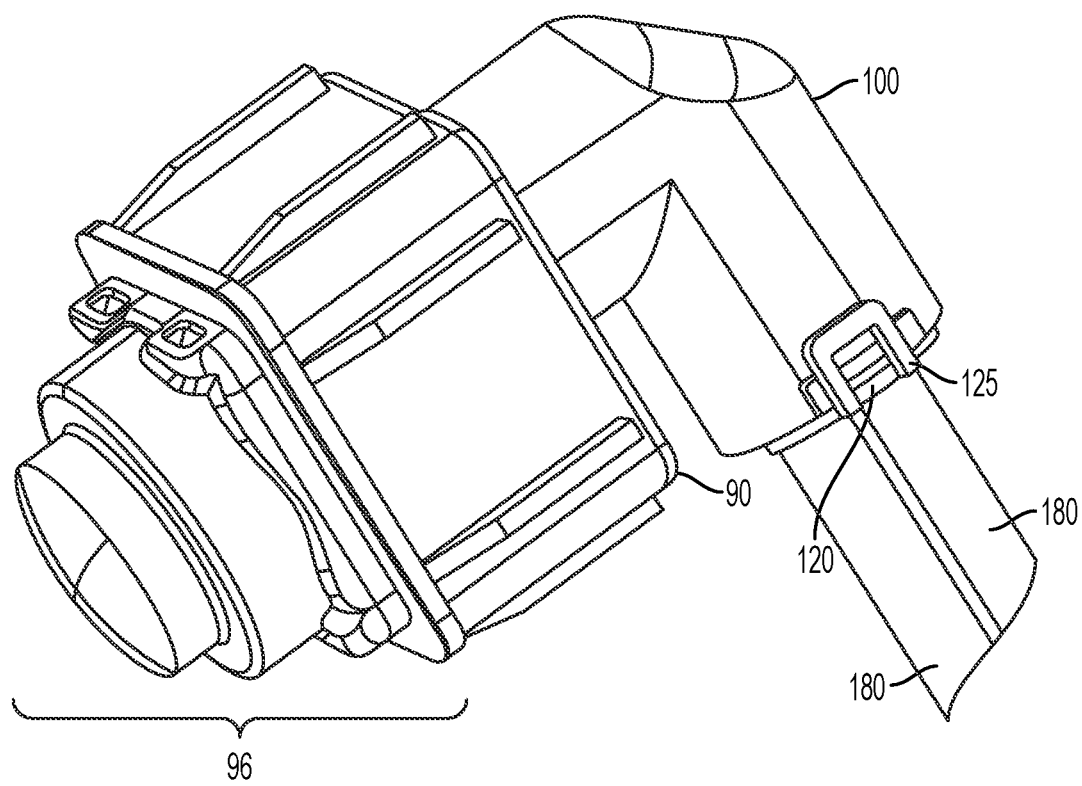
FIG. 18 is a solid perspective view of the automotive vision system camera shown in FIG. 17.

Optionally, the pins may possess a telescopic spring-loaded head (such as shown, for example, in FIGS. 13 and 14), which rests on the surface of a contact pad (such as can be seen with reference to FIGS. 8A-C).

Optionally, the contact's distance and the pad's size may be given or determined or selected by the desired degree of accepted tolerance. Due to tolerance dependent misalignments, the spring-loaded connector's head may come to rest outside the center of the contact pad. The full function is still given as long the connector's head stays on the pad, not contacting another pad or slipping into a gap in between pads. Because of this, tolerances are compensated to a certain (desired or threshold) degree.

Optionally, the contact pads may be (I) on the outside connector's side and the pins on the connector PCB's side (such as shown, for example, in FIGS. 4-6) or (II) vice versa (such as shown, for example, in FIGS. 7, 7A, 7B and 8A-C).

Figure 4:
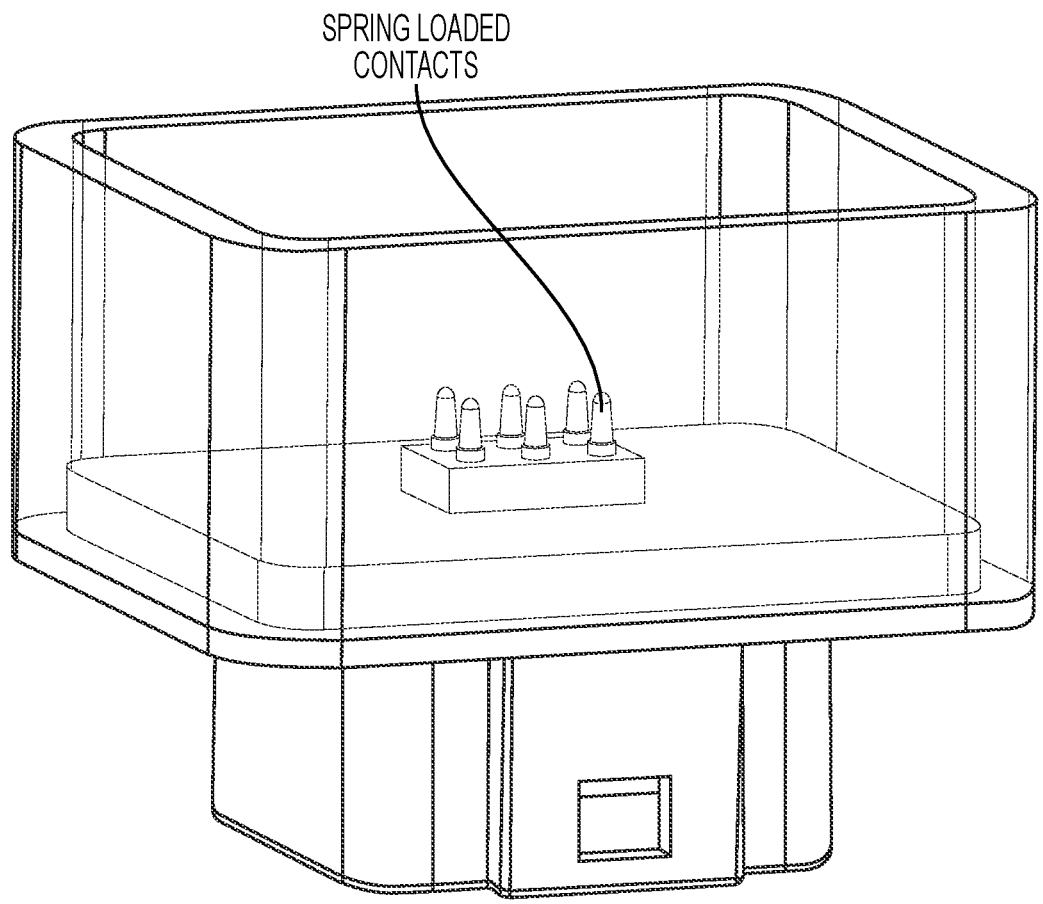
FIG. 4 is a perspective view of a camera bottom structure of a camera of the present invention, shown a semi-transparent side and having a similar connector contour as shown in FIG. 3, but featuring spring-loaded contacts.

For example, and with reference to FIG. 4, a camera bottom structure of a camera (shown with a semi-transparent side) has a similar connector contour as shown in FIG. 3, but features spring-loaded contacts, with the end on the inside of the bottom structure being capable to deflect while the end that reaches into the outside connector contour is a stiff or rigid or non-flexing or non-moving pin portion. In such an embodiment, the contacts may be disposed in a bezel or pin socket, or may be insert molded, such as by use of a pre-mold insertion part or a 2K process or the like.

Figure 5:
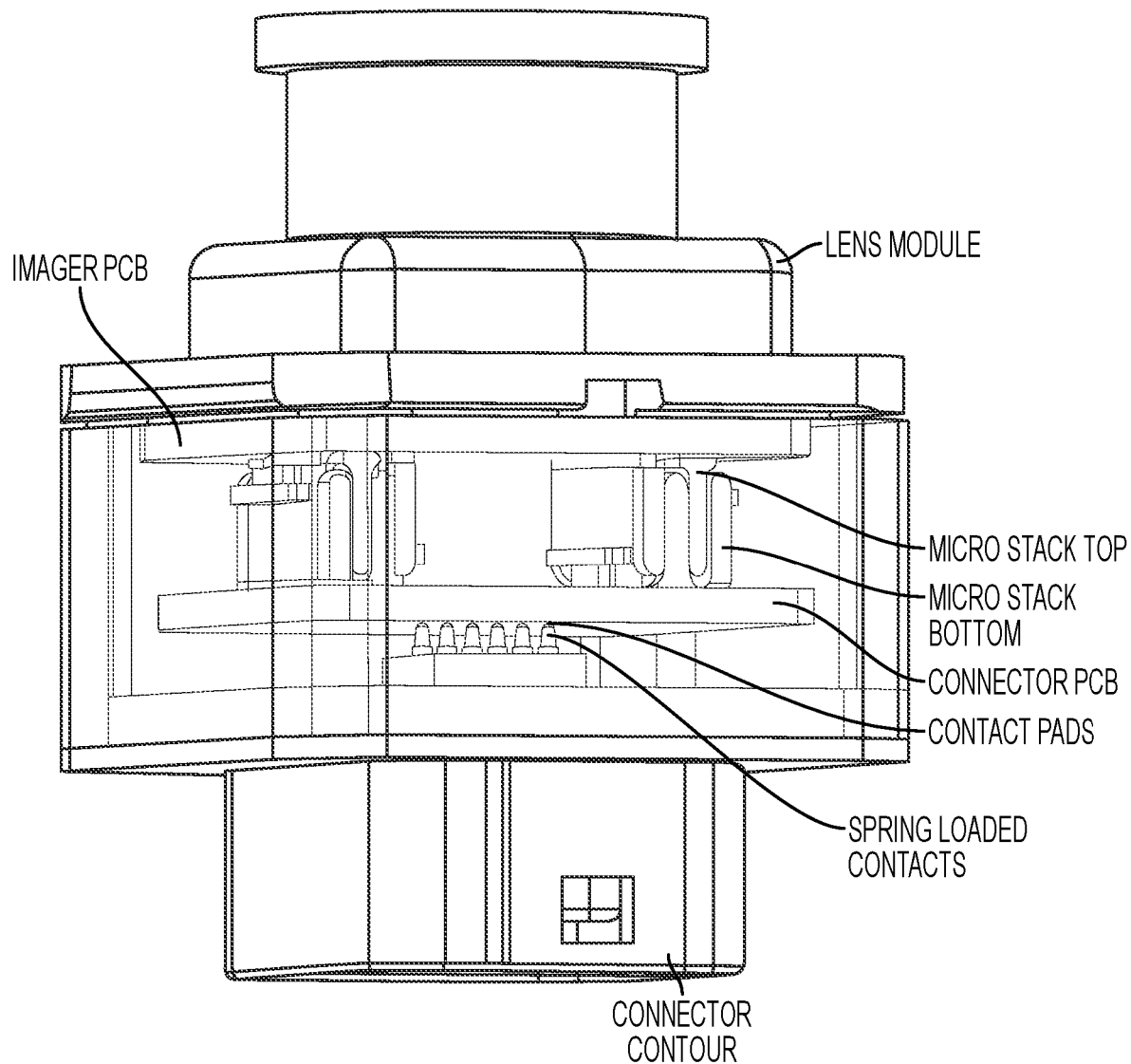
FIG. 5 is a side elevation of an automotive vision system camera of the present invention, shown with a semi-transparent side, with the spring-loaded connectors embedded into the bottom structure to connect to contact pads positioned on the connector PCB.

Optionally, and with reference to FIG. 5, an automotive vision system camera (shown with a semi-transparent side), includes self-adjusting, spring-loaded connectors or connector elements that are embedded into the bottom structure to connect to contact pads positioned on the connector PCB, with the imager PCB optionally connected to the connector PCB (such as by known micro stacks or the like). Mechanical decoupling may be accomplished by the spring deflection in a direction generally along the optical axis and sliding of the spring contacts over the connector pads in a direction generally orthogonal to the optical axis.

Optionally, and such as shown in FIGS. 33A-37B, the contact pads 328 and the spring-loaded telescopic connectors 326 may be disposed between two of the camera's PCBs (such as between the imager PCB 320 and the connector PCB 322 or the like) for decoupling one from the other.

Figure 6:
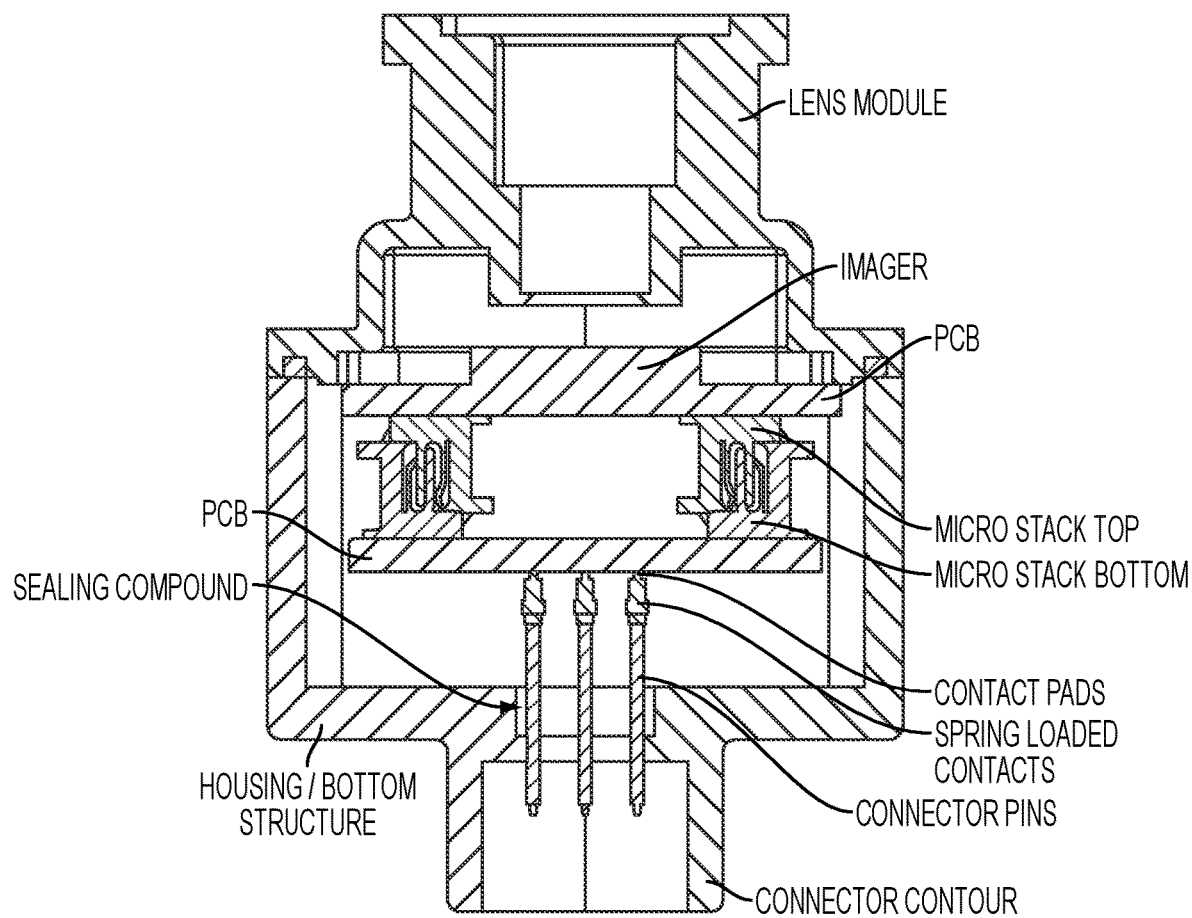
FIG. 6 is a sectional view of an automotive vision system camera of the present invention, shown with the contact pins inserted by a press fit and sealed by a surrounding sealing compound on the inside of the bottom structure, and with the structural set up of the imager PCB and lens module shown therein.
Figure 7A:
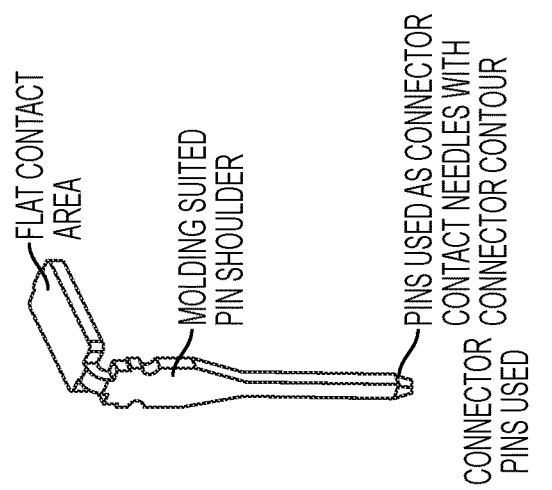
FIGS. 7A and 7B are perspective views of the connector pins, shown with flat hats for contacting the PCB contacts when the camera is assembled
Figure 7B:
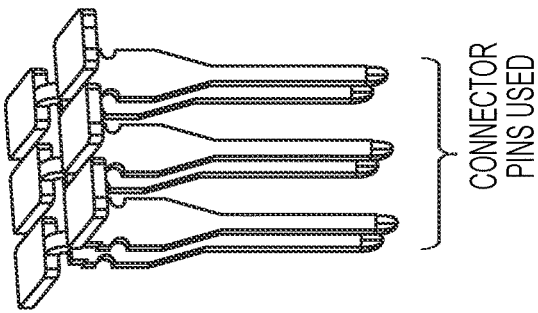
Figure 7:
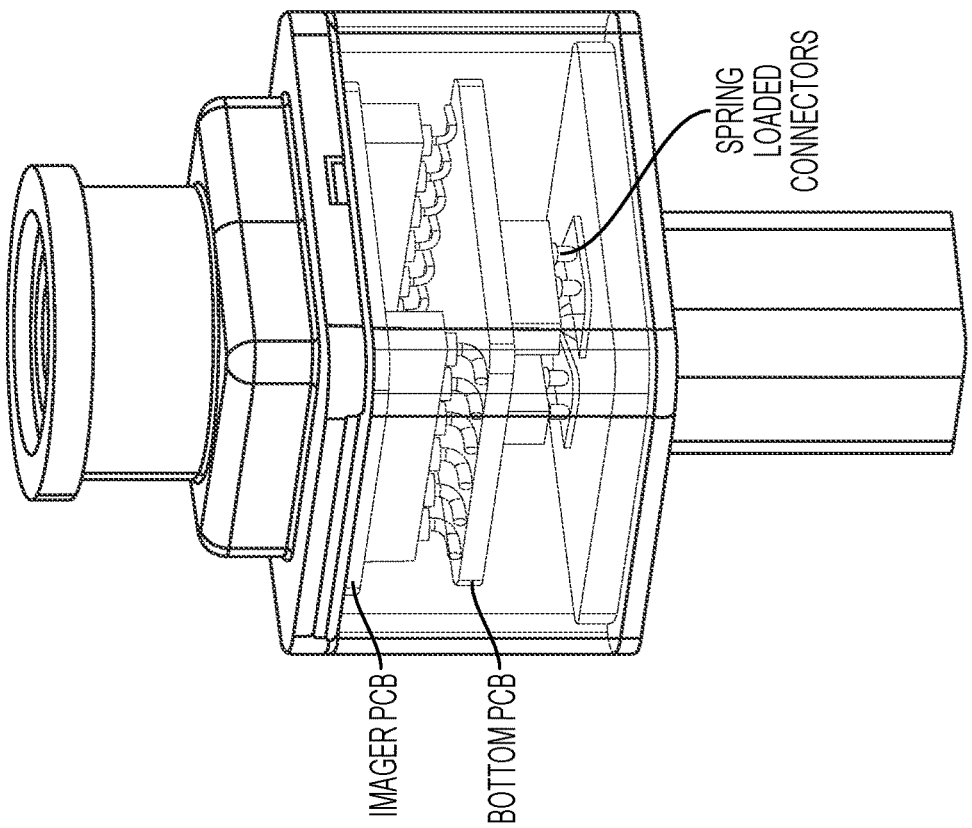
FIG. 7 is a perspective view of automotive vision system camera of the present invention, shown with the spring-loaded connectors assembled onto the connector PCB.

Optionally, and as shown in FIG. 6, the contact pins may be inserted by a press fit and sealed by a surrounding sealing compound on the inside of the bottom structure, with the structural set up of the imager PCB and lens module shown therein.

The self-adjusting spring-loaded connectors or pins may comprise any suitable extendable and retractable connector. For example, and with reference to FIG. 13, a telescopic spring-loaded contact may comprise a fixed portion and a movable portion, with a spring or biasing element disposed therein. The movable portion may be moved relative to the fixed portion (that may be attached at the bottom structure of the camera), and the spring may bias or urge the movable portion towards its extended position to urge the pin into contact with the electrical connectors when the camera module and housing are assembled.

Optionally, the pads may be attached to pins (or made as one single piece) permeating through the bottom structure/housing into the connector area. Preferably, the connector area is one piece with the bottom structure forming the connector contour.

Optionally, the spring-loaded connectors end into the pin needles permeating through the bottom structure/housing so as to be the contacts of the outside connector. Preferably, the connector area is one piece with the bottom structure forming the connector contour.

Figure 11:
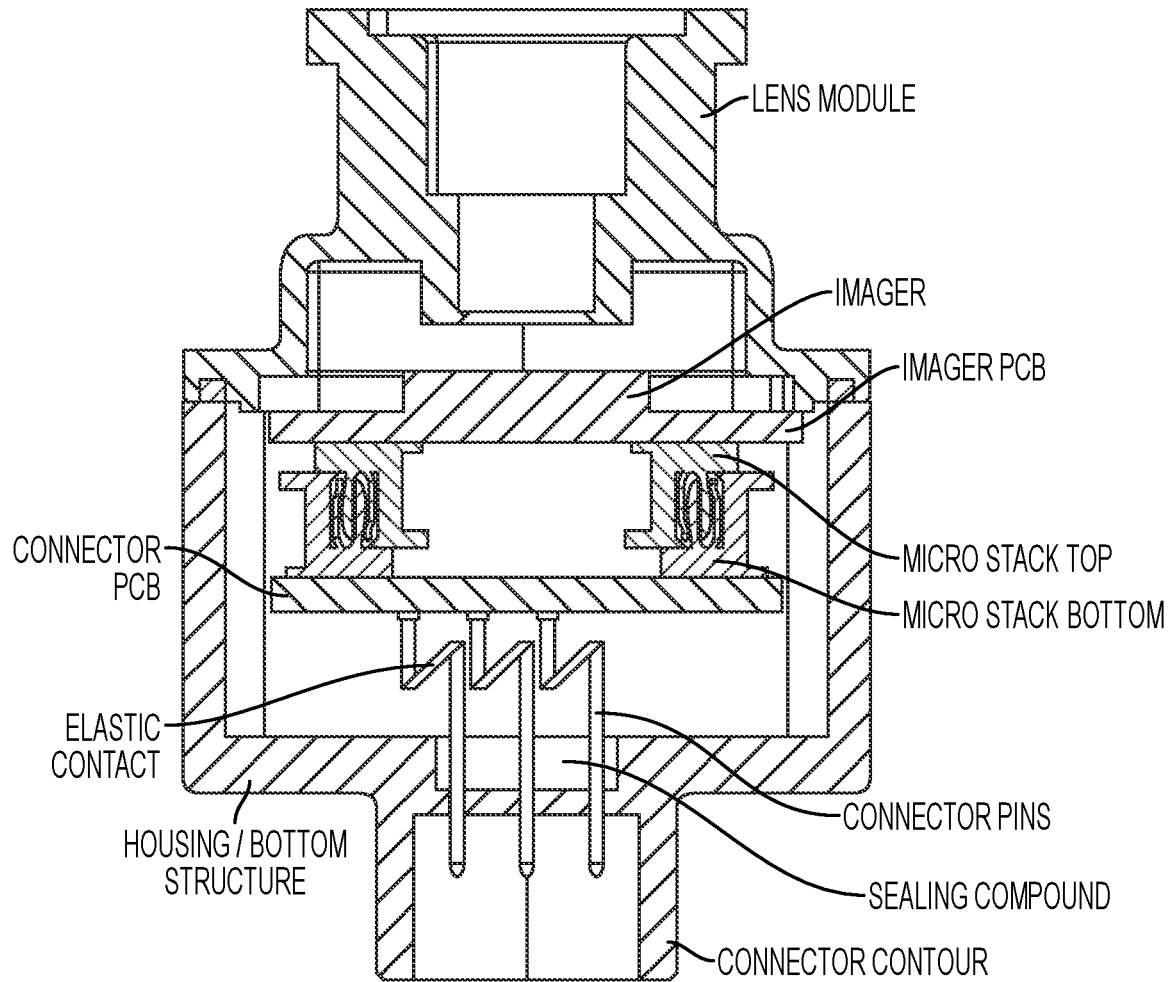
FIG. 11 is a sectional view of an automotive vision system camera of the present invention, showing a camera similar to the camera shown in FIG. 6, but with connector pins that are elastic, so that instead of spring-loaded telescopic connector pins, the pins shown in FIG. 11 are flexible in all three dimensions due to bending within a bending zone.

Optionally, there may be a flexible or elastic sealing element or structure between the connector contour and the outbounding connector, such as an elastic or pliable compound or foam or the like (such as can be seen in FIGS. 6, 10, 11) or such as an O-ring or the like (such as sealing element 330 in FIGS. 36A-37B).

Optionally, the outbounding connector comprises one or more male or female coaxial connectors (such as can be seen at outer connector structure 314 and coaxial connector 316 in FIGS. 33A-37B).

Optionally, the pins may possess press shoulders for supporting press fitting. Alternatively, the pins may be pre-molded, insertion molded, collected within a bezel, which becomes inserted itself, and/or the like. Preferably, the pins may become tightened by a sealing compound aligned inside or outside of the bottom structure housing around the pins or by a 2K molding process or the like.

Optionally, and with reference to FIGS. 7, 7A, 7B and 8A-C, a vision system camera includes self-adjusting connectors or connector elements or pins assembled onto the connector PCB (shown with a stack), and instead of spring-loaded connectors, pin needles with flat hats are assembled. The pins are preferably insertion molded into the bottom structure, with the pin needles reaching into the outside connector contour serving as connector plug contacts. In the illustrated embodiment, the connection between the imager PCB and the bottom PCB is solidly made by using SMD pins for connecting both sides, having reduced or no flexible features.

Figure 12C:
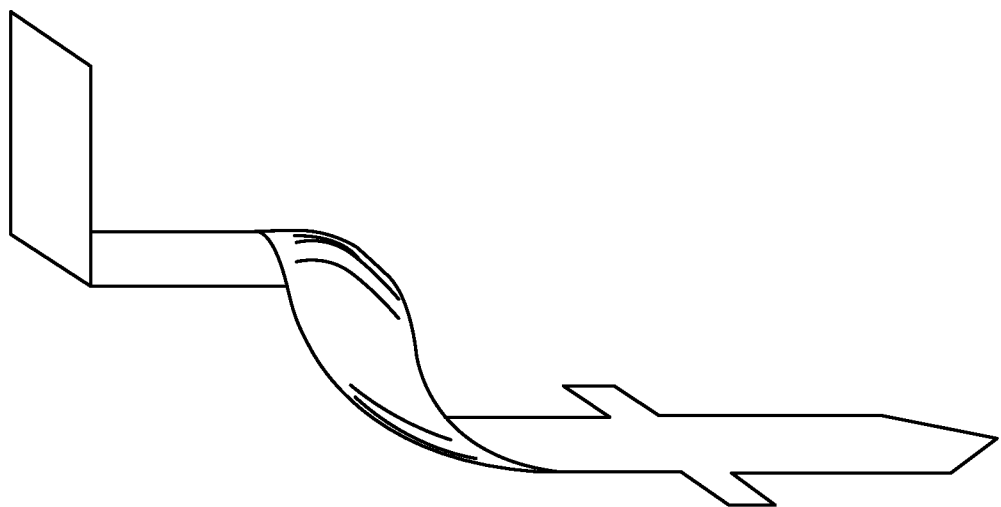
FIGS. 12A-C are perspective views of different examples of the flexible pin or elastic contact of FIG. 11.
Figure 12B:
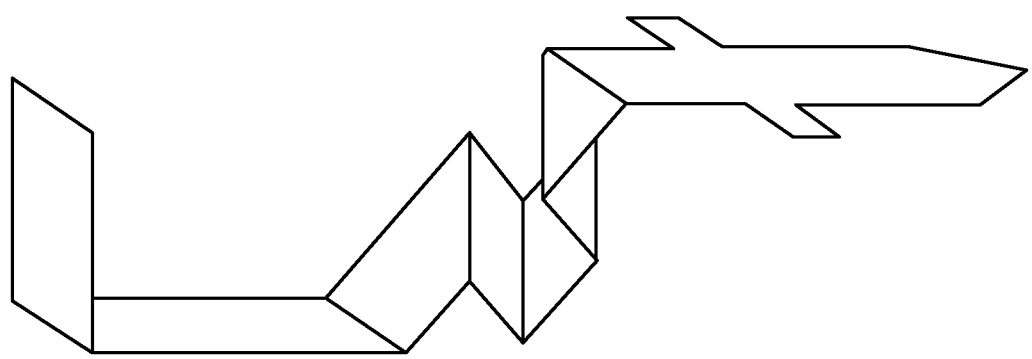
Figure 12A:
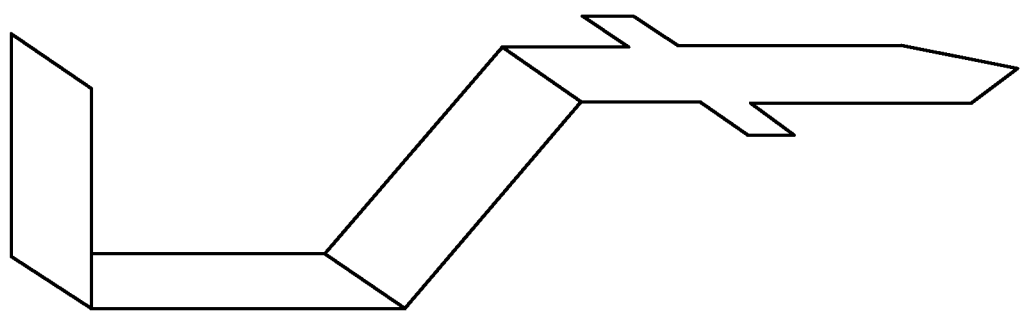

Optionally, the pins may comprise flexible pins, preferably by having an elastic bending zone, which may be specified in the Hook's borderlines (such as shown, for example, in FIG. 11). Alternatively, the contacts might become bent one time during assembly, exceeding the Hook's elasticity area (flowing) but still coping with mechanical changes over the camera's lifetime (within the resulting Hook's elasticity area). The pins elasticity clearance area may match the desired degree of tolerance. Because of that, tolerances are compensated. The bending area may be accomplished by having the pin comprise a stamped part which becomes bent in a way to allow enlarging and reducing in length and lateral shifts (such as shown in the examples of FIGS. 12A-C). The pins may possess press shoulders for supporting press fitting. Alternatively, the pins may be pre-molded, insertion molded, collected within a bezel (which may be inserted itself), and/or the like. Optionally, and desirably, the pins may become tightened by a sealing compound aligned inside or outside of the bottom structure housing around the pins or by a 2K molding process or the like.

For example, and as shown in FIG. 11, an automotive vision system camera includes self-adjusting connector pins that are elastic, so that instead of spring-loaded telescopic connector pins, the pins are flexible in all three dimensions due to bending within a bending zone. In the illustrated embodiment, the pins comprise a curl shape bending zone, with the pins soldered to the connector PCB surface. The micro stack and the imager PCB may be relatively rigidly assembled, and due to the elastic pins, the connector insertion forces and misalignments of the bottom structure to the lens holder structure due to tolerances or changes over the lifetime of the camera do not add forces to the lens holder structure.

The flexible pins may comprise any suitable form. For example, and as shown in FIGS. 12A-C, the flexible pin may comprise a stamped embodiment (FIG. 12A), or may comprise a more complex embodiment (FIG. 12B) that may have a higher degree of flexibility, or the flexible pin may comprise an embodiment (FIG. 12C) that has an elastic zone formed in a curl shape. Optionally, the elastic contacts may include a wing shape press shoulder that is implemented towards the connector contact region for maintaining the press fitting, with the flat area on the top end for a soldering pad.

Optionally, and with reference to FIGS. 15-19, 21, 24 and 25, a vision system camera includes an inside camera wiring 130 which has flexible properties. The wiring may lead from the PCB 70 (optionally via connectors 140 and sockets 150) to the housing bottom structure 90 at which a contacting area 41 is molded in for conducting to an outside connector structure 40.

Figure 19:
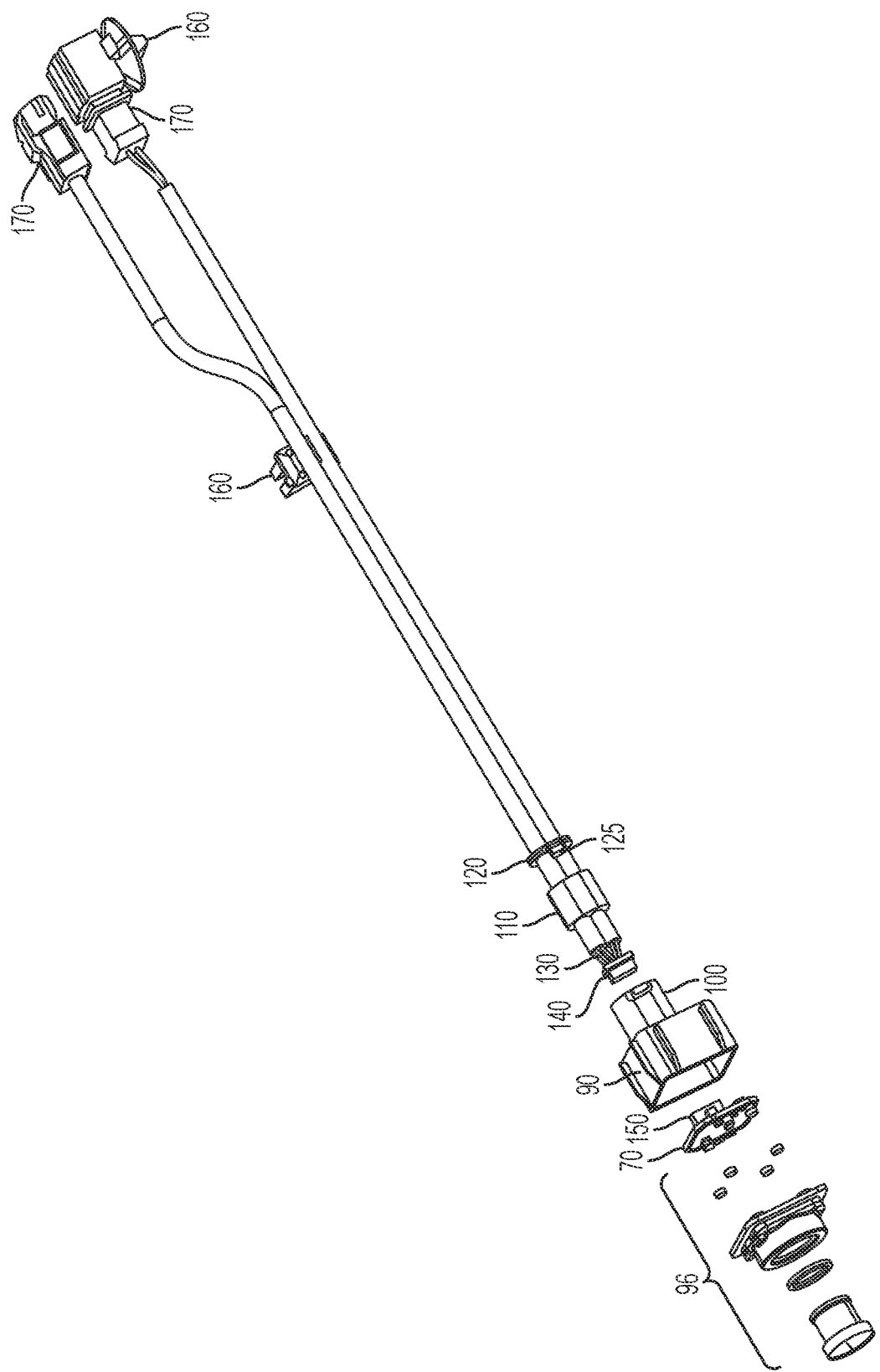
FIG. 19 is an exploded perspective view of an automotive vision system camera of the present invention, showing a camera similar to the camera shown in FIG. 15, showing the two outwarding cables (pigtail solution), fixations and connectors (FBAS/RGB and 4 pin)
Figure 20:
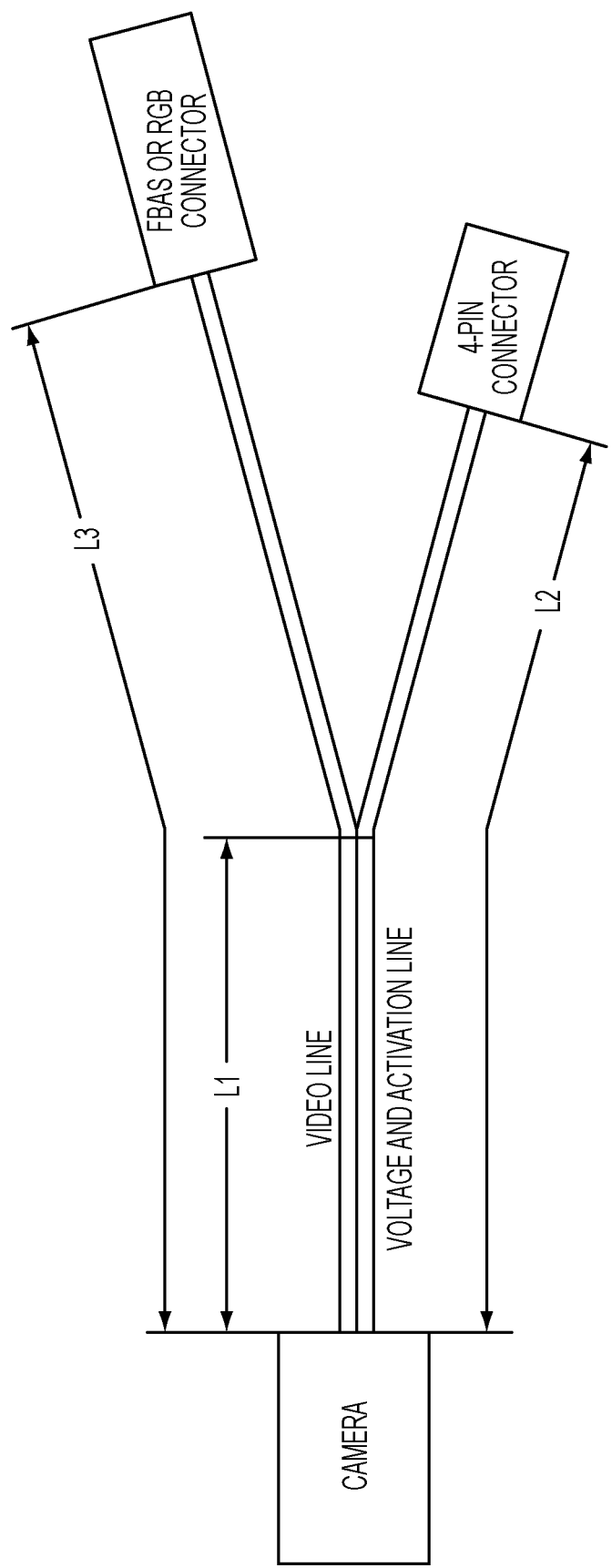
FIG. 20 is a schematic drawing of the pigtail solutions shown in FIGS. 15 to 19.
Figure 24:
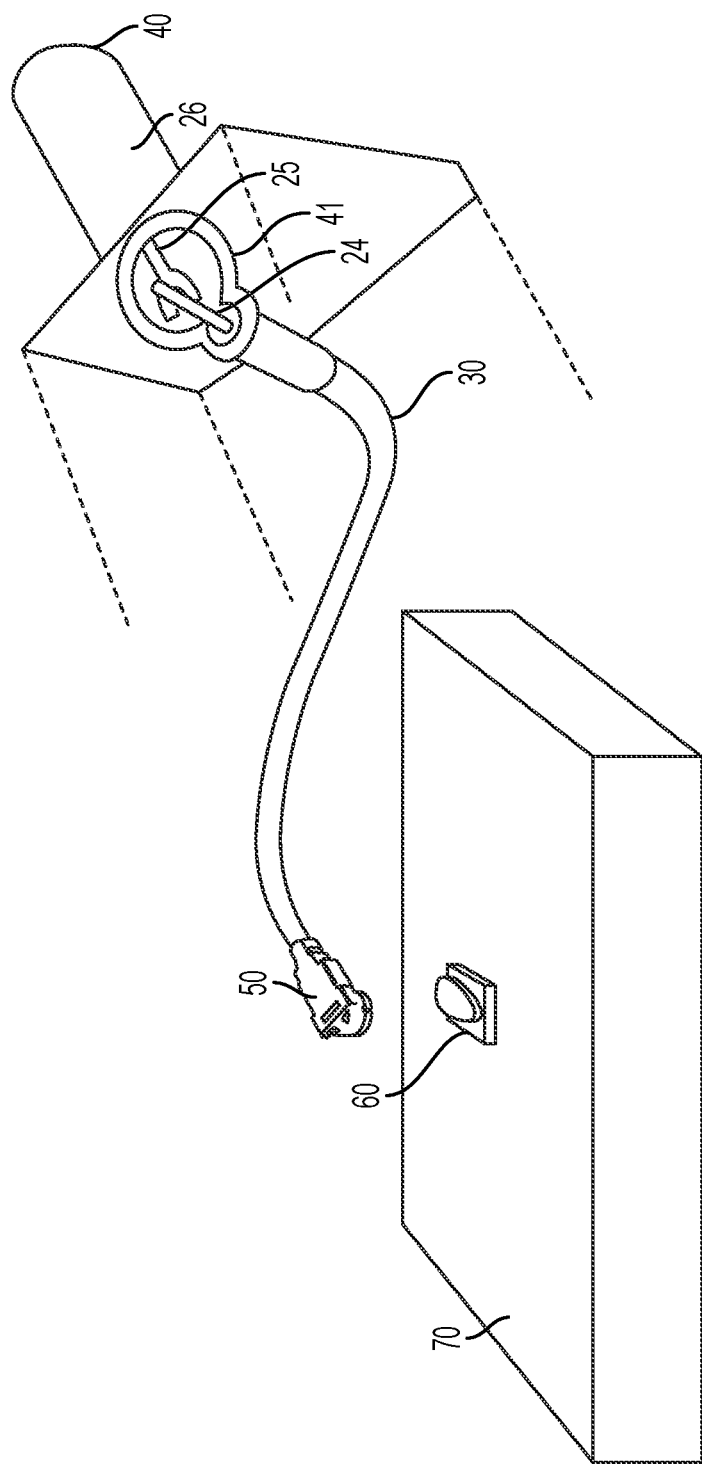
FIG. 24 shows a close up view onto the inside camera coaxial cabling leading from a scissor (gaps) forks structure to a coaxial PCB connector, similar to FIG. 21, and shown such that at the PCB there is a coaxial connector pole mounted on which the connector is pluggable.
Figure 25:
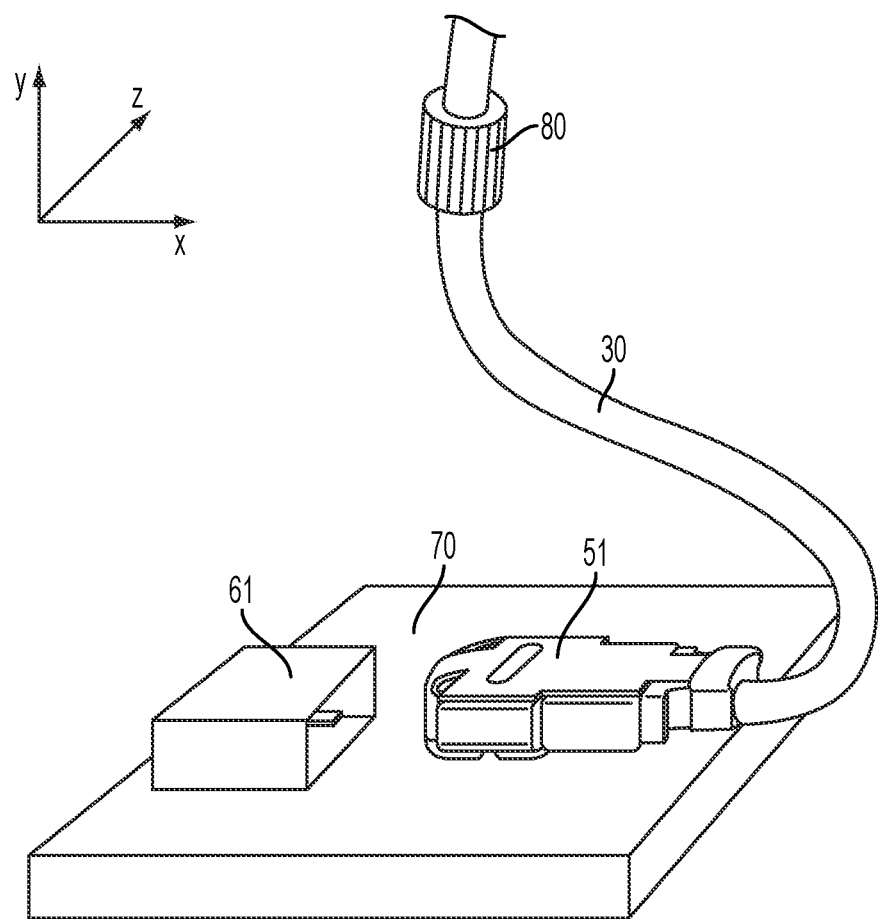
FIG. 25 shows a close up view of FIG. 21 of the inside camera coaxial squared PCB connector, shown such that at the PCB there is a coaxial connector pole mounted on which the connector is pluggable.
Figure 29:
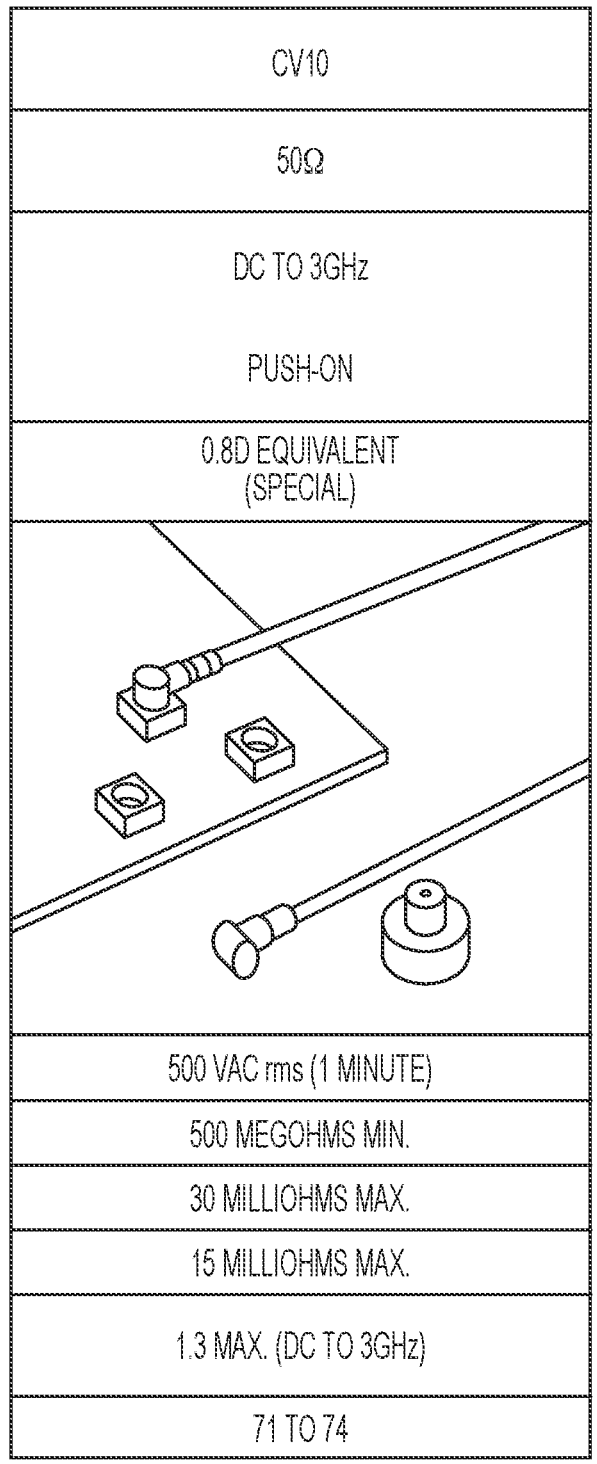

Alternative or additionally to that option, the inside camera wiring may be part of a cable structure 180, which reaches into the camera from the outside through a cable dome 100, having one or more cables of one of more wire bundles or one or more single wires (see FIGS. 19 and 20). These cables may be coaxial cables as referred in FIGS. 21-29. The cables may comprise a pull relief element 80 as shown in FIG. 25 or a cable tamping and or sealing 110. As an optional embodiment, the adhesive force of the tamping to the cable(s) and the outer structures wall/cable dome 100 and/or the sealing capabilities may be increased by compressing the tamping or sealing which may be out of a rubber, silicon, foam or fluffed polyurethane or the like. The compressing may be achieved by inserting (pressing) a lid 120 on top of the outside front of the tamping or sealing, which than snaps into grooves or clips 125 at or on top of the cable dome's wall (maintaining the pressure) as to be seen in the FIGS. 15-19.

Figure 21:
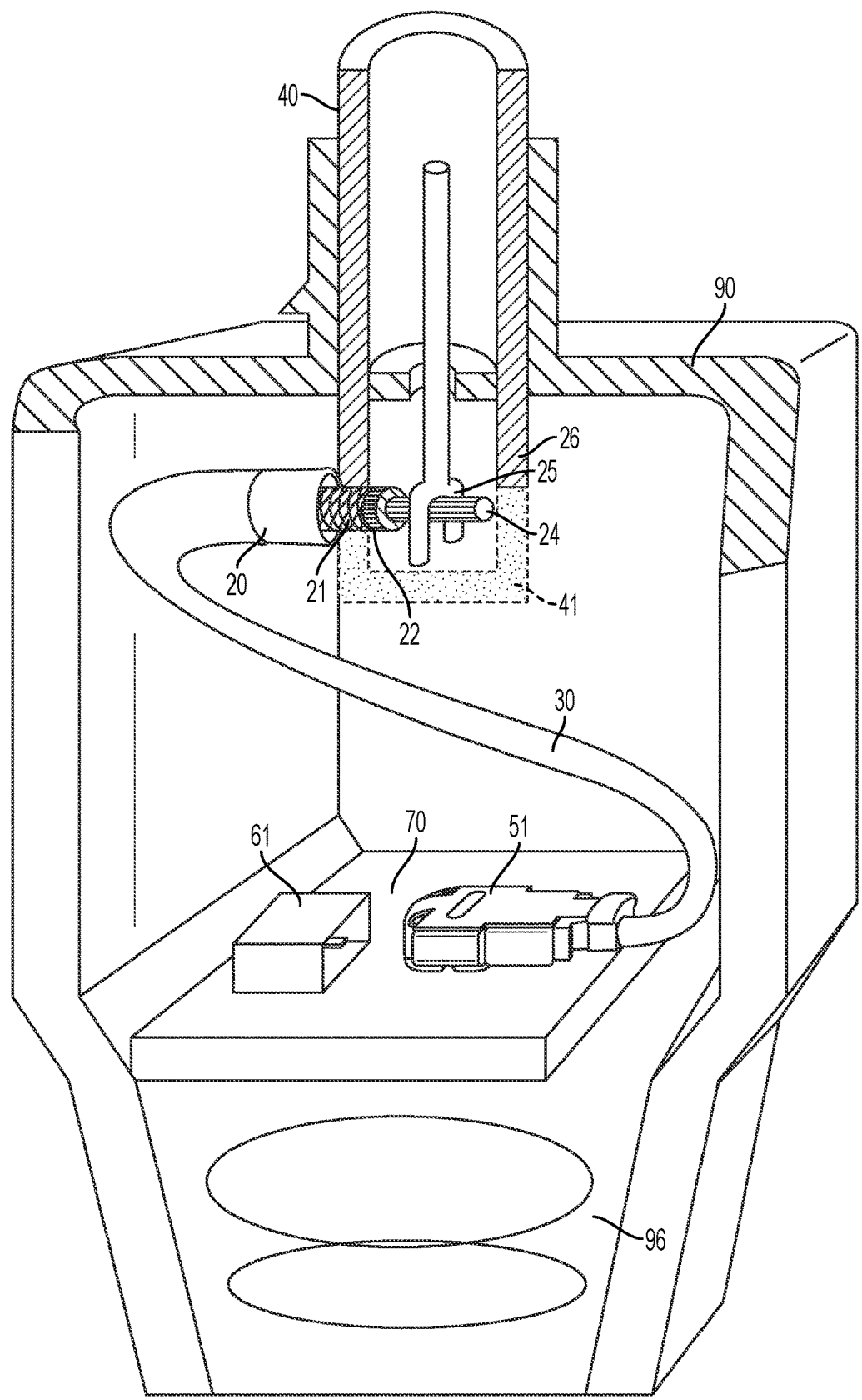
FIG. 21 is a schematic view of an automotive vision system camera of the present invention, showing a coaxial connector structure on the camera housing bottom, where the inner core and outer shielding of the outwarding coaxial connector reaches into the inside of the camera, with an inner (flexible) coaxial cable connected there which reaches to a camera's PCB connected via another coaxial connector.
Figure 22:
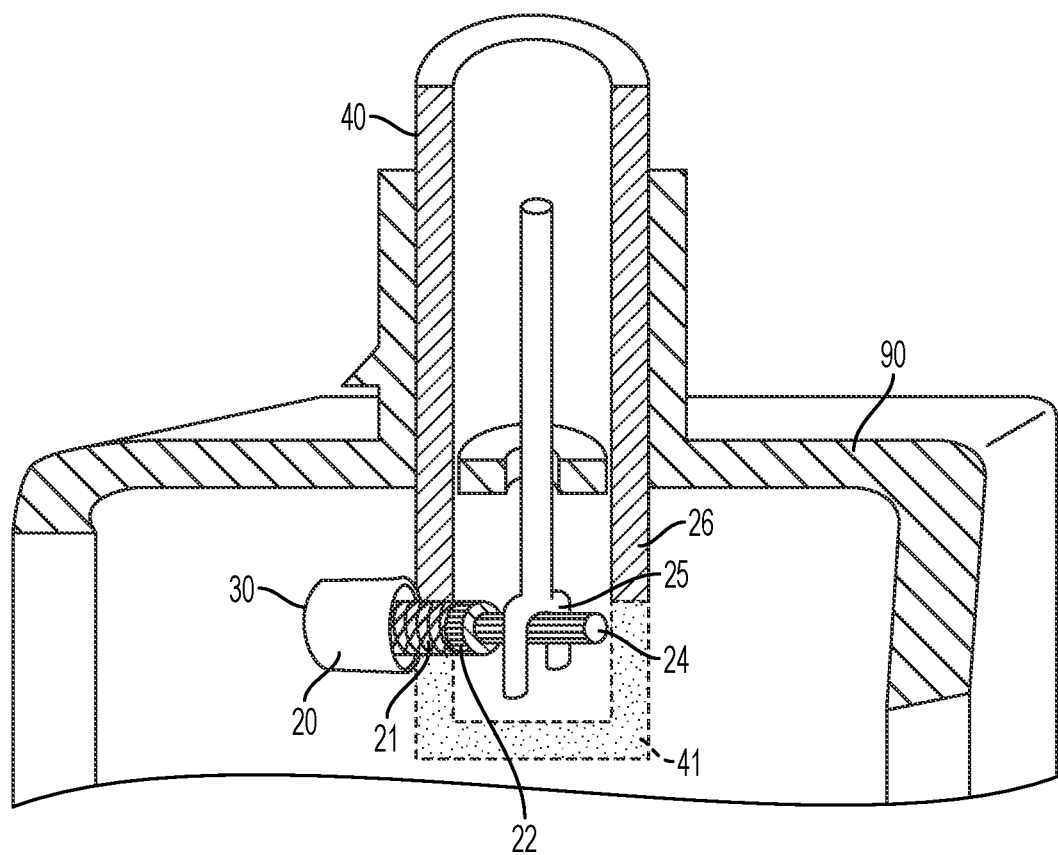
FIG. 22 shows a partial view of a coaxial connector structure on the camera housing bottom structure of FIG. 21, with the inner and outer core of the outwarding coaxial connector reaching into the inside of the camera, and there a structure has an area for connecting an inner coaxial cable inner core and shielding layer by scissor (gaps) forks.
Figure 23:
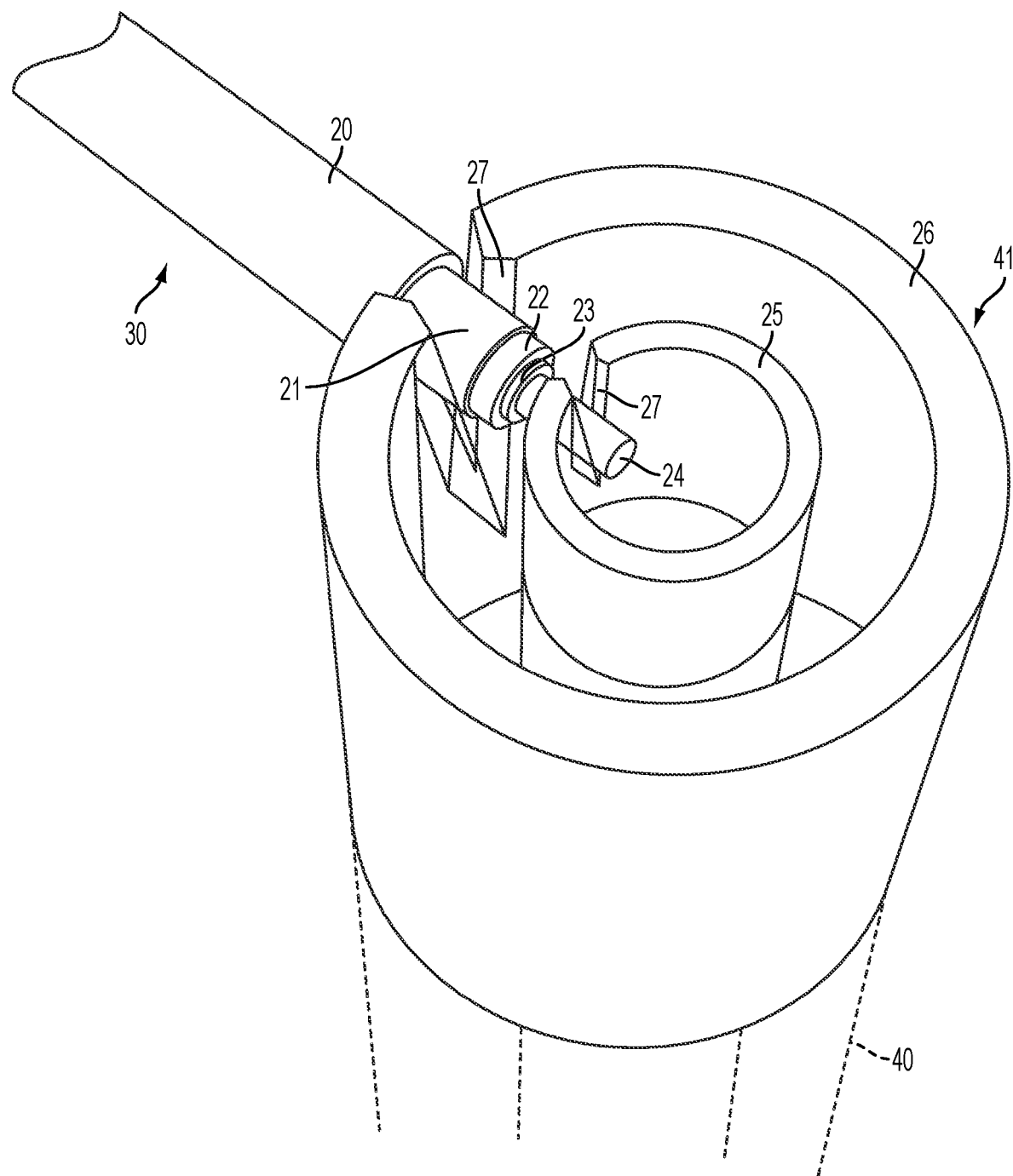
FIG. 23 shows a more precise view of FIG. 22 onto the scissor (gaps) forks structure together with a connected (inside camera) coaxial cable.

For allowing the manufacturing and handling of the camera's PCBs (and lens holder structure) alone not having the camera bottom structure attached during the manufacturing process, the camera bottom may comprise a connecting structure which may be molded in to the bottom structure. As another aspect of the invention, the inside connecting structure may show scissor shape contact edges 27 for scoring wires and its insulations, especially for coaxial cables as shown in FIGS. 22 and 23. Continuous EMC shielding is to be ensured at all solutions, especially when running high data rates as like video over LVDS. An example of a flexible coaxial cable wiring in accordance to the present invention is shown in FIGS. 21 and 24. The coaxial cable connectors shown in FIGS. 21 and 24 may comprise the JAE CV10 or the Herose pendant U.FL-LP-066 J1-(a(4)) with the matching SMD pole Herose U.FL-R-SMT-1(10) or the Herose GT 21 connector (squared shape). In general there is coaxial standard in automotive called FAKRA according DIN72594-1. That connector may find use at the far end of the wire harness shown in FIGS. 19 and 20. That connector's associated cables (RG 174 and RG 179) are too thick for the JAE CV10 or Herose U.FL-LP-066 J1-(a(4) cable shoe, future solutions may comprise the connector head from Herose U.FL-LP-066 J1-(a(4) with a coaxial connector shoe matching to the FAKRA associated coaxial cables RG 174 and RG 179. By that, direct connecting pig tail solutions with leading the coaxial cable trough a cable dome into the camera onto the PCB direct will be applicable.

Figure 30:
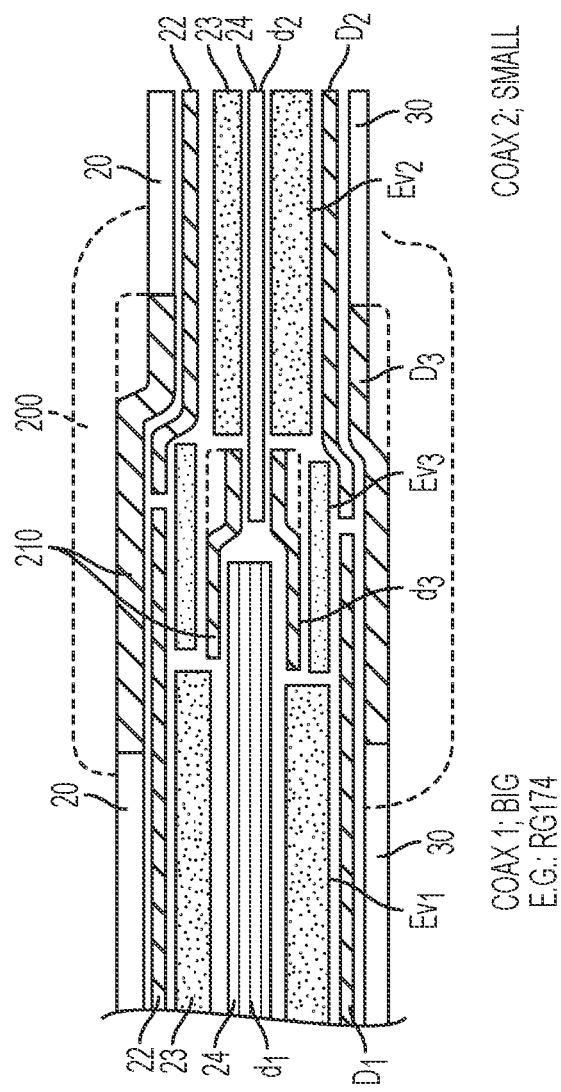
FIG. 30 is a schematic of a coaxial cable crimp element in accordance to the present invention.

As another aspect of the invention, mating coaxial cables may be interconnect by a crimping element 210 as shown in FIG. 30. The crimp element may comprise a metal tube for taking the inner cores of the coaxial connectors and another metal tube for conducting the cables shielding layers. The crimp element may comprise its own dielectrical layer. The diameters and the Epsilon-R of the conducting parts may be adjusted to the diameters and the Epsilon-R of the different sizes of the mating cables in a way that the wave resistant's threshold is minimal, by that the least signal reflectance can be achieved which. Signal reflectance within a coaxial line is to be avoided due to limiting signal noise.

Figure 31:
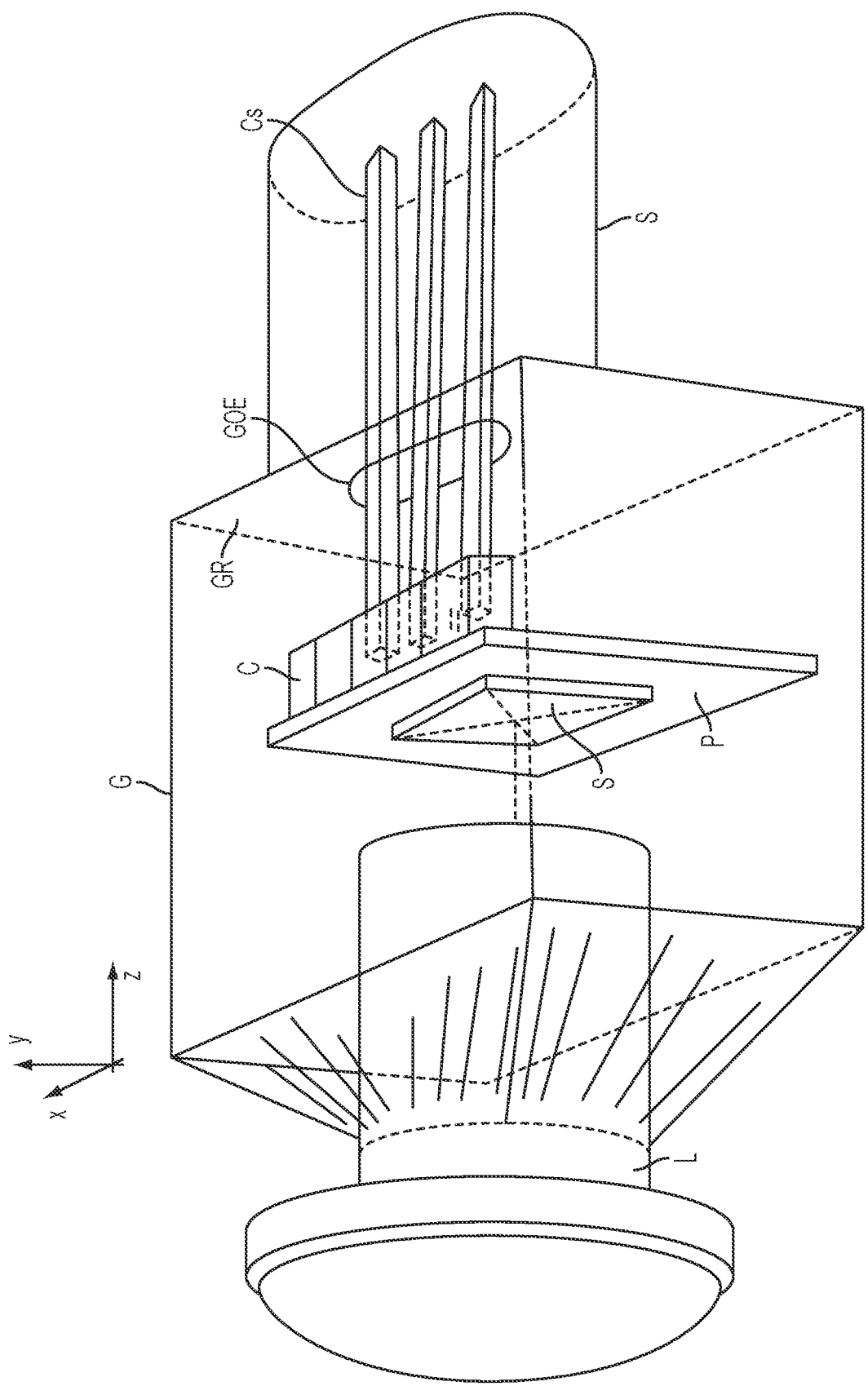
FIG. 31 is a perspective and semi-transparent or partial sectional view of another automotive vision system camera of the present invention.
Figure 33B:
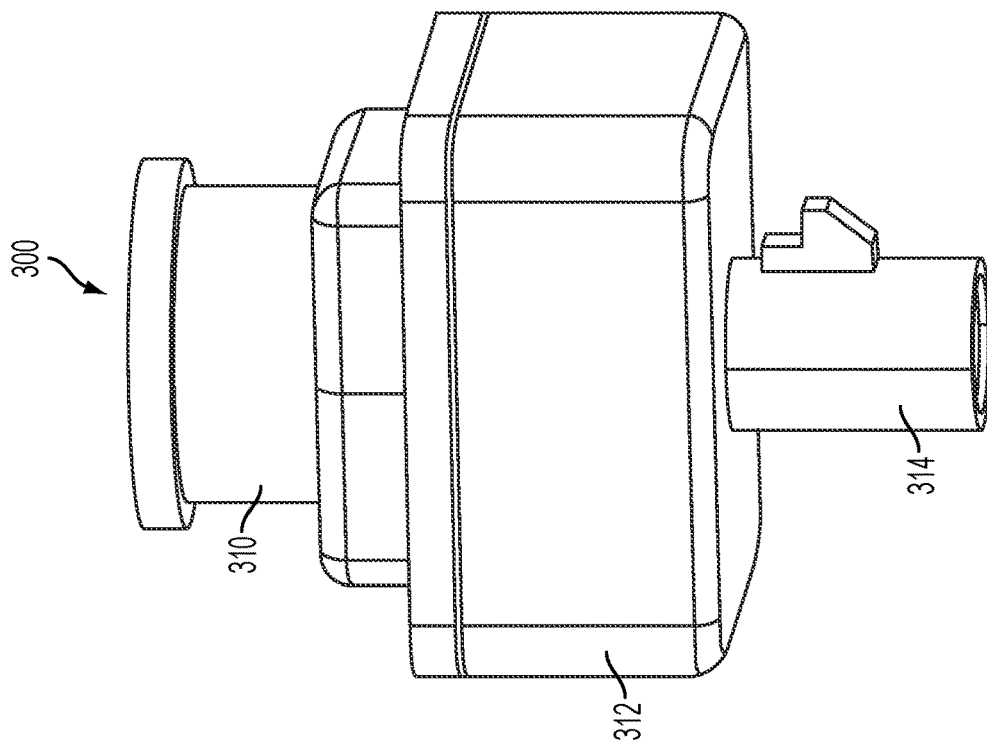
FIG. 33B is a perspective view (not transparent) of the automotive vision system camera of FIG. 33A.
Figure 33A:
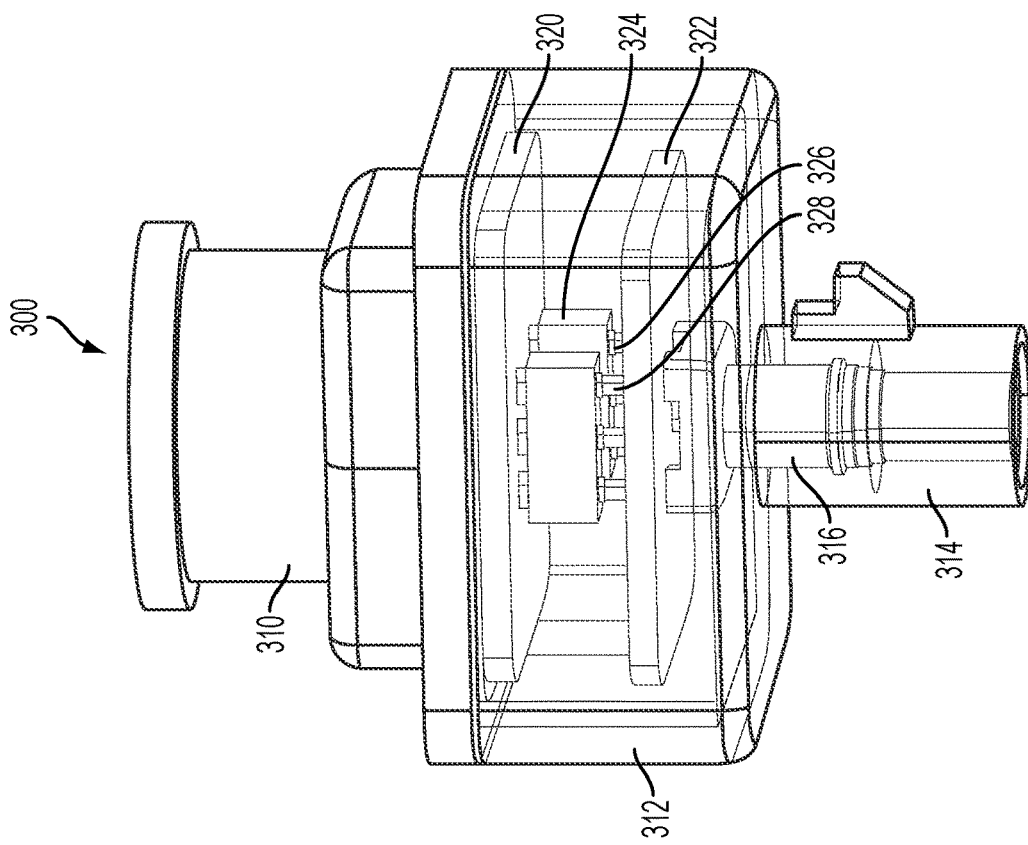
FIG. 33A is a perspective semi-transparent view of an automotive vision system camera of the present invention, shown with the spring-loaded connectors assembled onto the imager PCB, and connecting contacts assembled on a connector PCB, which also carries a coaxial connector structure that extends or reaches or is accessible outside or exterior or outbound the camera housing.
Figure 35B:
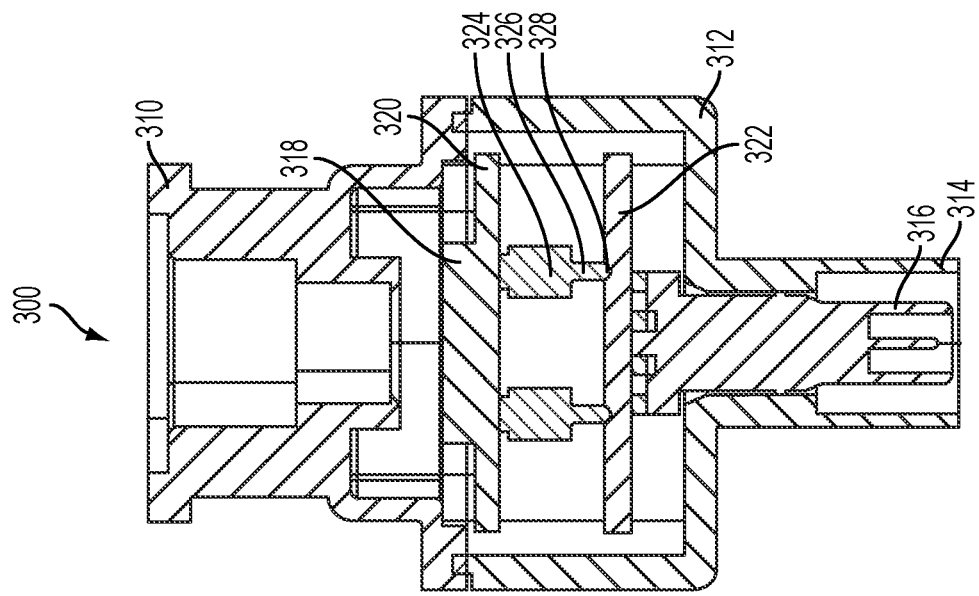
FIG. 35B is a cross cut view of the automotive vision system camera of FIG. 33A from the same side as FIG. 34B.
Figure 35A:
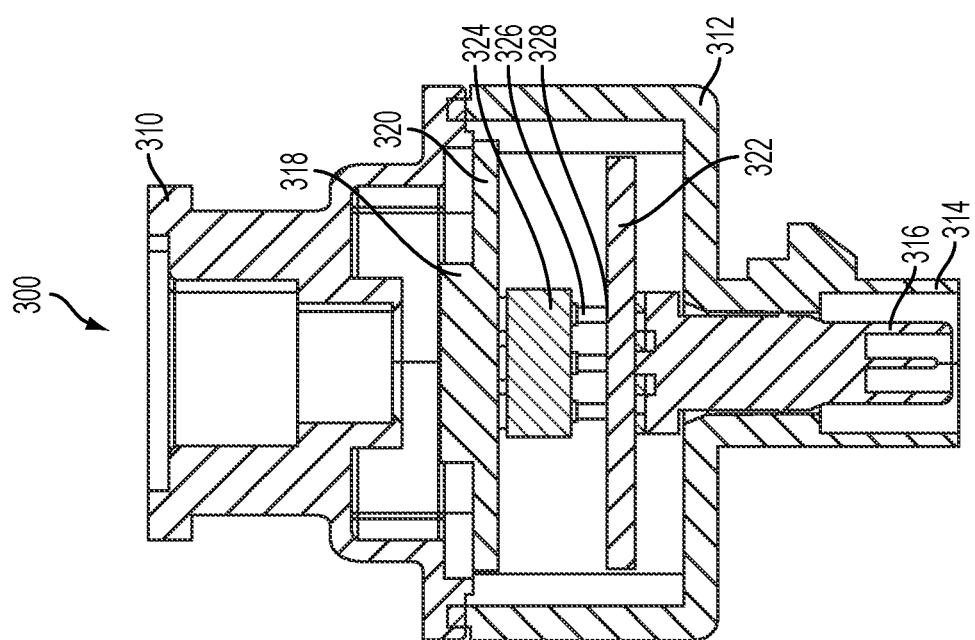
FIG. 35A is a cross cut view of the automotive vision system camera of FIG. 33A from the same side as FIG. 34A.
Figure 36B:
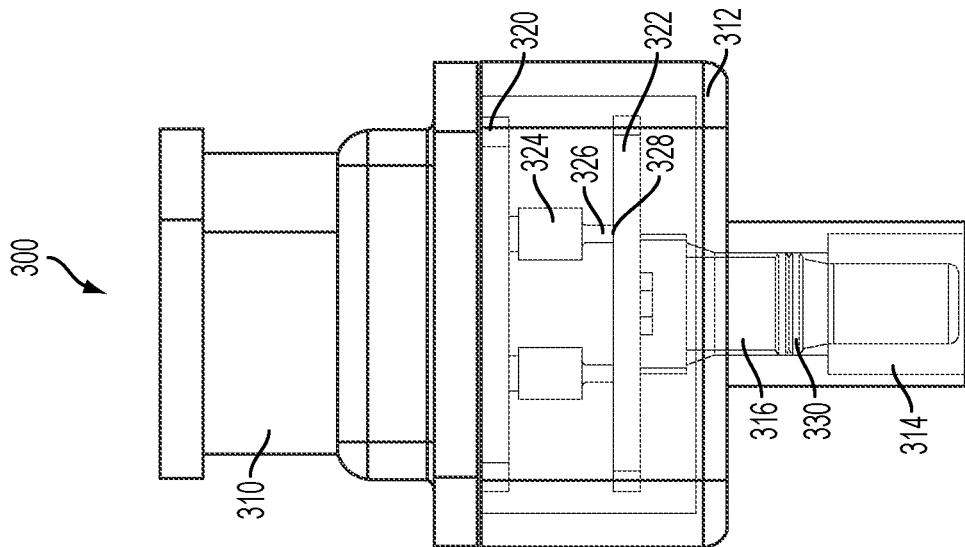
FIG. 36B is a semi-transparent side view of the automotive vision system camera of FIG. 36A, shown from a second, 90 degrees turned side as compared to FIG. 36A.
Figure 36A:
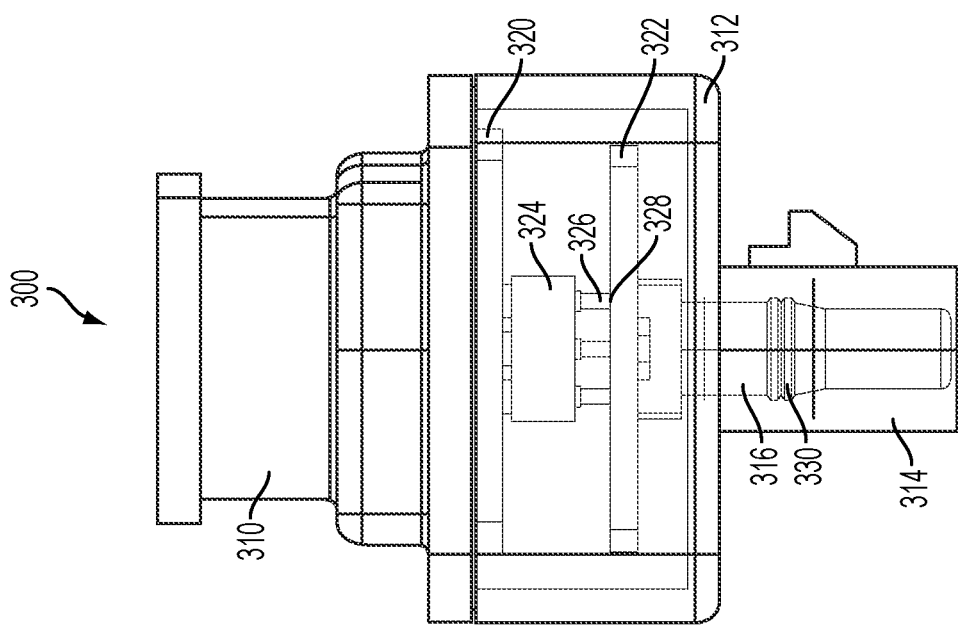
FIG. 36A is a semi-transparent side view of an automotive vision system camera similar to that of FIG. 34A, shown from one side (the same side as the view in FIG. 33A) and having an elastic sealing element additionally for tightening or clamping or compressing between the coaxial connector and the connector housing structure.
Figure 37B:
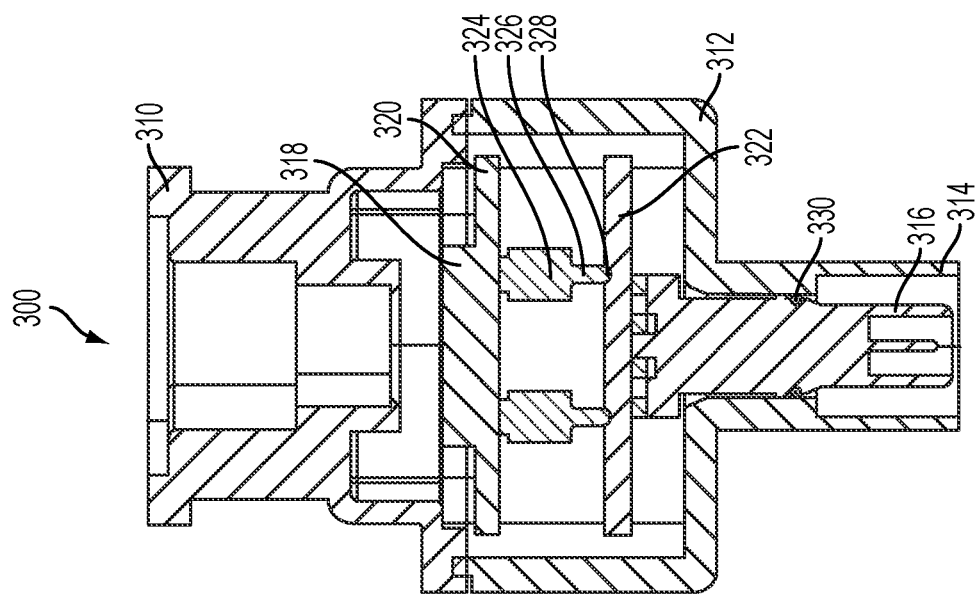
FIG. 37B is a cross cut view of the automotive vision system camera of FIG. 36B from the same side.
Figure 37A:
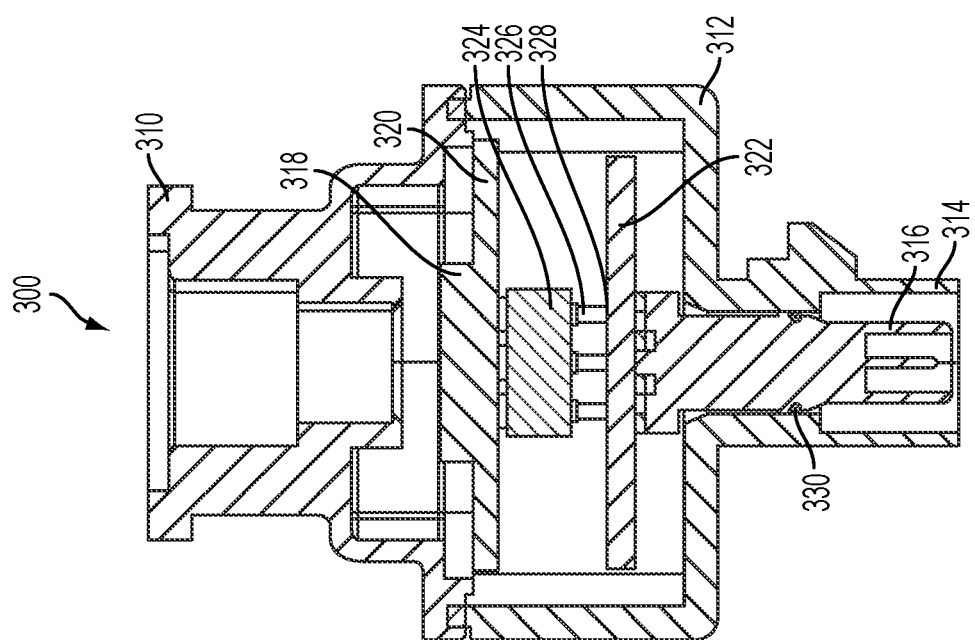
FIG. 37A is a cross cut view of the automotive vision system camera of FIG. 36A from the same side.

Optionally, and with reference to FIG. 31, a camera of the present invention includes a sensor S that is soldered to the PCB P with tolerances xs, ys and zs as well as rotation rs and tilt ts. One or more connectors C is/are soldered to the PCB P with tolerances xc, yc and zc as well as rotation rc and tilt tc. The connector(s) may be of any type: a male or female type, a socket, pin header, terminal strip, coax type and/or the like. Preferably, the connector may comprise a male pin header as shown in FIG. 31.

The PCB P is aligned with the lens L of the camera with respect to rotation, tilt, focus and position. The lens also has tolerances in the distance zs, position xs and ys and angles rs and ts. The tolerances are expected to sum up to the values below:

dx~+−0.4 mm
dy~+−0.4 mm
dz~+−0.5 mm dr~+−1 degree
dt~+−1 degree.

The PCB P and lens L are fixed in their aligned position by use of, for example, a camera housing. The camera housing's rear has an opening for the connector's contacts Cs. The camera's housing is equipped with a sleeve S at the contacts Cs. The sleeve S may be designed to comply with the requirements for connectors defined by the automotive OEMs, for example. The sleeve S may be designed to build up a waterproof connector in combination with an adequate counterpart. The sleeve S may be designed to protect the contacts Cs against electrostatic contact discharge. Optionally, an additional seal (not shown in the sketch) may be applied at the sleeve S (surrounding the contacts Cs) to protect the camera housing against water ingress when no counterpart is attached.

The contacts Cs location and direction vary with tolerances dx, dy, dz, dr and dt in relation to the sleeve S. A counterpart, referred to as cable connector CC is specified according to the following:
the cable connector may be attached to a cable,
the cable connector builds up a waterproof combination together with the sleeve S,
the cable connector catches the pins within their tolerances dx, dy, dz, dr and dt during insertion,
the cable connector may be designed to comply with the requirements for connectors as defined by the automotive OEMs, amongst others as defined in the documents listed above, and their successors.

The above specifies three section's properties of the camera of the present invention, namely, (a) the lens system—PCB tolerance, (b) the connector tolerance, and (c) the counterpart connector or counter connector (i.e., the electrical connector at the harness side or at the vehicle wiring harness that connects to the connector at the camera).

Optionally, the present invention provides flexibility that may be achieved by the counter connector or sleeve, which would allow for mounting the connector pins at the camera in a typical or solid way, or the tolerance may be achieved by a combination of both (with both sides having flexible properties/means). As shown in FIGS. 32A-C, a cable shoe with flexible properties as described above may be suitable for use at the connector harness side (counter connector) when connecting to or contacting the camera of FIG. 31. For example, each wire of a cable shoe or connector 250 (a single wire is shown in FIGS. 32B and 32C) may have a core wire 260 and a sheathing 270. The terminals or connectors may be attached to the wire via crimping of a core clamp 280 onto the core wire 260 and crimping of a sheathing clamp 290 onto the sheathing 270. The connector thus provides a flexible cable connector or shoe for the counterpart connector for connecting to the connector at the camera.

Therefore, the present invention provides a camera for a vehicle vision system, with the camera having enhanced electrical connection between an electrical wiring or lead that connects to terminals or pins of a camera connector and the circuitry of the imager PCB. The enhanced electrical connection is provided via a spring-loaded pin or connector or via a flexible connector, with the connector or connectors moving or flexing to maintain alignment and electrical connection between the connector portion of the camera housing and the imager PCB or other circuitry within the camera housing. The present invention thus enhances the manufacturing of the camera module and provides enhanced electrical connection over the life time of the camera and provides reduced stress/strain at the connection and thus reduces misalignment of the lens relative to the imager over the life time of the camera and during use of the camera in harsh exterior environments during use of the vehicle and in all climates and driving conditions. Optionally, the camera or camera module and connectors of the present invention may utilize aspects of the cameras described in PCT Application No. PCT/US2012/026073, filed Feb. 22, 2012 and published Aug. 30, 2012 as International Publication No. WO 2012/116043, which is hereby incorporated herein by reference in its entirety.

Thus, in accordance with the present invention, economy and efficiency of manufacture and assembly of an automotive camera module is enhanced. In a preferred embodiment, a housing portion (usually the lower portion of the finished overall camera assembly) of a camera assembly is provided with a multi-pin electrical connector integrally formed therewith (preferably via integral molding in a polymeric injection molding operation where the individual metallic electrical connector elements that form the individual pins of the electrical connector are inserted into an injection mold and polymeric resin is injected into the mold so that, upon demolding, the electrical connector elements are integrally molded or insert molded at the housing). The individual electrically conductive metallic connector elements each comprise a pin portion that extends beyond or outside or through the housing structure into a formed connector contour or socket. At the other end of each electrical connector element or pin there is established an electrically conducting self-adjusting (typically spring-loaded or flexible/flexed) terminal.

The circuitry of the automotive camera comprises a two-sided circuit element or printed circuit board (PCB). On one side of the PCB a photosensor array imager chip is disposed along with associated circuitry (and optionally the imager chip may be disposed at the side of the PCB or spaced from the side of the PCB and electrically connected therewith via electrical connecting elements or connectors). On the opposing or opposite or second side of the PCB, further electrical circuitry and/or electrical contact points or pads or pods or elements are established in such a manner that when the PCB is being assembled into an automotive camera while the camera itself is being manufactured, the individual connector elements or pins coincide with and align with and make elastic/spring-loaded/resilient electrical connection with the corresponding ones of individual pads or elements at the PCB. The pads/elements are themselves in electrical continuity with circuitry disposed at either or both of the sides/surfaces of the PCB (or disposed at the imager chip or the like).

Thus, and in accordance with the present invention, economical, effective and reliable electrical contact can be made between the vehicle wiring and circuitry without recourse to the likes of electrical soldering and/or electrical flying leads or similar conventional connection schemes. Also, tolerances of manufacture, including imprecision in component assembly/disposition and/or change or movement during the lifetime of usage of the camera on a vehicle, may be accommodated by and/or compensated for the flexible or elastic or spring-loaded or self-adjusting electrical connection scheme of the present invention.

Optionally, and desirably, the system of the present invention utilizes an image-based sensor or camera and image processing of image data captured by the camera. The system and/or camera of the vehicle includes an image processor operable to process image data captured by the camera or cameras, such as for detecting objects or other vehicles or pedestrians or the like in the field of view of one or more of the cameras. For example, the image processor may comprise an EYEQ2 or EYEQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The camera or imager or imaging sensor may comprise any suitable camera or imager or sensor. Optionally, the camera may comprise a "smart camera" that includes the imaging sensor array and associated circuitry and image processing circuitry and electrical connectors and the like as part of a camera module, such as by utilizing aspects of the vision systems described in PCT Application No. PCT/US2012/066571, filed Nov. 27, 2012, which is hereby incorporated herein by reference in its entirety.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, an array of a plurality of photosensor elements arranged in at least about 640 columns and 480 rows (at least about a 640×480 imaging array and optionally a megapixel imaging array that provides high definition imaging), with a respective lens focusing images onto respective portions of the array. The photosensor array may comprise a plurality of photosensor elements arranged in a photosensor array having rows and columns. The logic and control circuit of the imaging sensor may function in any known manner, and the image processing and algorithmic processing may comprise any suitable means for processing the images and/or image data. For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or PCT Application No. PCT/US2010/047256, filed Aug. 31, 2010 and published Mar. 10, 2011 as International Publication No. WO 2011/028686 and/or International Publication No. WO 2010/099416, published Sep. 2, 2010, and/or PCT Application No. PCT/US10/25545, filed Feb. 26, 2010 and published Sep. 2, 2010 as International Publication No. WO 2010/099416, and/or PCT Application No. PCT/US2012/048800, filed Jul. 30, 2012, and/or PCT Application No. PCT/US2012/048110, filed Jul. 25, 2012, and/or PCT Application No. PCT/CA2012/000378, filed Apr. 25, 2012, and/or PCT Application No. PCT/US2012/056014, filed Sep. 19, 2012, and/or PCT Application No. PCT/US12/57007, filed Sep. 25, 2012, and/or PCT Application No. PCT/US2012/061548, filed Oct. 24, 2012, and/or PCT Application No. PCT/US2012/062906, filed Nov. 1, 2012, and/or PCT Application No. PCT/US2012/063520, filed Nov. 5, 2012, and/or PCT Application No. PCT/US2012/064980, filed Nov. 14, 2012, and/or PCT Application No. PCT/US2012/066570, filed Nov. 27, 2012, and/or PCT Application No. PCT/US2012/066571, filed Nov. 27, 2012, and/or PCT Application No. PCT/US2012/068331, filed Dec. 7, 2012, and/or PCT Application No. PCT/US2012/071219, filed Dec. 21, 2012, and/or PCT Application No. PCT/US2013/022119, filed Jan. 18, 2013, and/or PCT Application No. PCT/US2013/027342, filed Feb. 22, 2013, and/or U.S. patent application Ser. No. 13/774,317, filed Feb. 22, 2013 and published Aug. 29, 2013 as U.S. Publication No. 2013/0222592; Ser. No. 13/774,315, filed Feb. 22, 2013 and published Aug. 22, 2013 as U.S. Publication No. 2013/0215271; Ser. No. 13/681,963, filed Nov. 20, 2012 and published Jun. 6, 2013 as U.S. Publication No. 2013/0141578; Ser. No. 13/660,306, filed Oct. 25, 2012 and published May 9, 2013 as U.S. Publication No. 2013/0116859; Ser. No. 13/653,577, filed Oct. 17, 2012 and published Apr. 25, 2013 as U.S. Publication No. 2013/0099908; and/or Ser. No. 13/534,657, filed Jun. 27, 2012 and published Jan. 3, 2013 as U.S. Publication No. 2013/0002873, and/or U.S. provisional applications, Ser. No. 61/736,104, filed Dec. 12, 2012; Ser. No. 61/736,103, filed Dec. 12, 2012; Ser. No. 61/734,457, filed Dec. 7, 2012; Ser. No. 61/733,598, filed Dec. 5, 2012; Ser. No. 61/733,093, filed Dec. 4, 2012; Ser. No. 61/727,912, filed Nov. 19, 2012; Ser. No. 61/727,911, filed Nov. 19, 2012; Ser. No. 61/727,910, filed Nov. 19, 2012; Ser. No. 61/718,382, filed Oct. 25, 2012; Ser. No. 61/710,924, filed Oct. 8, 2012; Ser. No. 61/696,416, filed Sep. 4, 2012; Ser. No. 61/682,995, filed Aug. 14, 2012; Ser. No. 61/682,486, filed Aug. 13, 2012; Ser. No. 61/680,883, filed Aug. 8, 2012; Ser. No. 61/678,375, filed Aug. 1, 2012; Ser. No. 61/676,405, filed Jul. 27, 2012; Ser. No. 61/666,146, filed Jun. 29, 2012; Ser. No. 61/653,665, filed May 31, 2012; Ser. No. 61/653,664, filed May 31, 2012; Ser. No. 61/648,744, filed May 18, 2012; Ser. No. 61/624,507, filed Apr. 16, 2012; Ser. No. 61/616,126, filed Mar. 27, 2012; Ser. No. 61/615,410, filed Mar. 26, 2012; and/or Ser. No. 61/613,651, filed Mar. 21, 2012, which are all hereby incorporated herein by reference in their entireties. The system may communicate with other communication systems via any suitable means, such as by utilizing aspects of the systems described in PCT Application No. PCT/US10/038477, filed Jun. 14, 2010, and/or U.S. patent application Ser. No. 13/202,005, filed Aug. 17, 2011, now U.S. Pat. No. 9,126,525, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,123,168; 7,004,606; 6,946,978; 7,038,577; 6,353,392; 6,320,176; 6,313,454 and 6,824,281, and/or International Publication No. WO 2010/099416, published Sep. 2, 2010, and/or PCT Application No. PCT/US10/47256, filed Aug. 31, 2010 and published Mar. 10, 2011 as International Publication No. WO 2011/028686, and/or U.S. patent application Ser. No. 12/508,840, filed Jul. 24, 2009, and published Jan. 28, 2010 as U.S. Pat. Publication No. US 2010-0020170, and/or PCT Application No. PCT/US2012/048110, filed Jul. 25, 2012, and/or U.S. patent application Ser. No. 13/534,657, filed Jun. 27, 2012 and published Jan. 3, 2013 as U.S. Publication No. 2013/0002873, which are all hereby incorporated herein by reference in their entireties. The camera or cameras may comprise any suitable cameras or imaging sensors or camera modules, and may utilize aspects of the cameras or sensors described in U.S. patent application Ser. No. 12/091,359, filed Apr. 24, 2008 and published Oct. 1, 2009 as U.S. Publication No. US-2009-0244361, and/or Ser. No. 13/260, 400, filed Sep. 26, 2011, now U.S. Pat. Nos. 8,542,451, and/or 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760, 962; 5,715,093; 5,877,897; 6,922,292; 6,757,109; 6,717, 610; 6,590,719; 6,201,642; 6,498,620; 5,796,094; 6,097, 023; 6,320,176; 6,559,435; 6,831,261; 6,806,452; 6,396, 397; 6,822,563; 6,946,978; 7,339,149; 7,038,577; 7,004,606 and/or 7,720,580, and/or U.S. patent application Ser. No. 10/534,632, filed May 11, 2005, now U.S. Pat. No. 7,965, 336; and/or PCT Application No. PCT/US2008/076022, filed Sep. 11, 2008 and published Mar. 19, 2009 as International Publication No. WO 2009/036176, and/or PCT Application No. PCT/US2008/078700, filed Oct. 3, 2008 and published Apr. 9, 2009 as International Publication No. WO 2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526, 103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877, 897; 5,949,331; 6,222,447; 6,302,545; 6,396,397; 6,498, 620; 6,523,964; 6,611,202; 6,201,642; 6,690,268; 6,717, 610; 6,757,109; 6,802,617; 6,806,452; 6,822,563; 6,891, 563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,720,580; 7,038,577; 5,929,786 and/or 5,786,772, and/or U.S. patent application Ser. No. 11/239,980, filed Sep. 30, 2005, now U.S. Pat. No. 7,881,496, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. patent application Ser. No. 10/538,724, filed Jun. 13, 2005 and published Mar. 9, 2006 as U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. Nos. 7,255,451 and/or 7,480,149; and/or U.S. patent application Ser. No. 11/226,628, filed Sep. 14, 2005 and published Mar. 23, 2006 as U.S. Publication No. US-2006-0061008, and/or Ser. No. 12/578,732, filed Oct. 14, 2009 and published Apr. 22, 2010 as U.S. Publication No. 2010/0097469, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011 and published Jun. 28, 2012 as U.S. Publication No. 2012/0162427, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. patent application Ser. No. 11/226,628, filed Sep. 14, 2005 and published Mar. 23, 2006 as U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in PCT Application No. PCT/US2011/056295, filed Oct. 14, 2011 and published Apr. 19, 2012 as International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in PCT Application No. PCT/US10/25545, filed Feb. 26, 2010 and published on Sep. 2, 2010 as International Publication No. WO 2010/099416, and/or PCT Application No. PCT/US10/47256, filed Aug. 31, 2010 and published Mar. 10, 2011 as International Publication No. WO 2011/028686, and/or PCT Application No. PCT/US2011/062834, filed Dec. 1, 2011 and published Jun. 7, 2012 as International Publication No. WO 2012/075250, and/or PCT Application No. PCT/US2012/048993, filed Jul. 31, 2012, and/or PCT Application No. PCT/US11/62755, filed Dec. 1, 2011 and published Jun. 7, 2012 as International Publication No. WO 2012-075250, and/or PCT Application No. PCT/CA2012/000378, filed Apr. 25, 2012, and/or PCT Application No. PCT/US2012/066571, filed Nov. 2, 2012, and/or PCT Application No. PCT/US2012/068331, filed Dec. 7, 2012, and/or PCT Application No. PCT/US2013/022119, filed Jan. 18, 2013, and/or U.S. patent application Ser. No. 13/333,337, filed Dec. 21, 2011 and published Jun. 28, 2012 as U.S. Publication No. 2012/0162427, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. patent application Ser. No. 12/091,525, filed Apr. 25, 2008, now U.S. Pat. No. 7,855,755; Ser. No. 11/226,628, filed Sep. 14, 2005 and published Mar. 23, 2006 as U.S. Publication No. US-2006-0061008; and/or Ser. No. 10/538,724, filed Jun. 13, 2005 and published Mar. 9, 2006 as U.S. Publication No. US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and 6,124,886, and/or U.S. patent application Ser. No. 10/538,724, filed Jun. 13, 2005 and published Mar. 9, 2006 as U.S. Publication No. US-2006-0050018, which are hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. A vehicular camera assembly, the vehicular camera assembly comprising:
a camera housing comprising a front housing portion and a rear housing portion, wherein the rear housing portion joins the front housing portion, and wherein the front housing portion accommodates a lens, and wherein the rear housing portion comprises a connector portion configured for connecting to a vehicle wiring connector when the vehicular camera assembly is installed at a vehicle;
a first printed circuit board disposed at the front housing portion, the first printed circuit board having a front side and a rear side separated by a thickness of the first printed circuit board;
an imager disposed at the front side of the first printed circuit board and aligned with the lens;
a first electrical connector disposed at the rear side of the first printed circuit board;
wherein the first electrical connector comprises one selected from the group consisting of (i) a plurality of individual electrical pin-receiving socket elements and (ii) a plurality of individual electrical pin elements;
a second printed circuit board having a front side and a rear side separated by a thickness of the second printed circuit board;
a second electrical connector disposed at the front side of the second printed circuit board;
wherein the second electrical connector comprises another selected from the group consisting of (i) a plurality of individual electrical pin-receiving socket elements and (ii) a plurality of individual electrical pin elements;
wherein the first printed circuit board and the second printed circuit board are juxtaposed and parallel to one another, and wherein the rear side of the first printed circuit board faces the front side of the second printed circuit board;
wherein circuitry of the second printed circuit board is electrically connected to circuitry of the first printed circuit board via electrical connection of the first electrical connector and the second electrical connector made by plug-socket connection of the individual electrical pin elements and corresponding individual electrical pin-receiving socket elements;
wherein the connector portion of the rear housing portion comprises a plurality of terminal pins;
wherein each terminal pin of the plurality of terminal pins has a first end interior the camera housing and a second end at the connector portion and accessible from exterior the camera housing;
wherein the first ends of the terminal pins electrically connect to respective electrical contacts at the rear side of the second printed circuit board when the rear housing portion is joined with the front housing portion; and
wherein the connector portion of the rear housing portion is configured for connecting to the vehicle wiring connector when the vehicular camera assembly is installed at the vehicle to electrically connect the second ends of the terminal pins to the vehicle wiring connector of the equipped vehicle.

2. The vehicular camera assembly of claim 1, wherein the first electrical connector comprises the plurality of individual electrical pin-receiving socket elements, and wherein the second electrical connector comprises the plurality of individual electrical pin elements.

3. The vehicular camera assembly of claim 1, wherein the first electrical connector comprises the plurality of individual electrical pin elements, and wherein the second electrical connector comprises the plurality of individual electrical pin-receiving socket elements.

4. The vehicular camera assembly of claim 1, wherein the first electrical connector comprises a header connector disposed at the rear side of the first printed circuit board, and wherein the header connector comprises the plurality of individual electrical pin-receiving socket elements, and wherein the second electrical connector comprises the plurality of individual electrical pin elements.

5. The vehicular camera assembly of claim 1, wherein the plurality of individual electrical pin elements comprise a plurality of individual extendable and retractable electrically conductive pin elements.

6. The vehicular camera assembly of claim 1, wherein the plurality of individual electrical pin elements comprises a plurality of individual spring-loaded pin elements.

7. The vehicular camera assembly of claim 1, wherein the plurality of terminal pins are disposed at a connector structure attached at the rear housing portion.

8. The vehicular camera assembly of claim 7, further comprising a sealing element disposed between the connector portion and the connector structure.

9. The vehicular camera assembly of claim 1, wherein the first printed circuit board is attached at the front housing portion with the imager aligned with the lens.

10. The vehicular camera assembly of claim 9, wherein the second printed circuit board is disposed at the rear housing portion.

11. A vehicular camera assembly, the vehicular camera assembly comprising:
a camera housing comprising a front housing portion and a rear housing portion, wherein the rear housing portion joins the front housing portion, and wherein the front housing portion accommodates a lens, and wherein the rear housing portion comprises a connector portion configured for connecting to a vehicle wiring connector when the vehicular camera assembly is installed at a vehicle;
a first printed circuit board disposed at the front housing portion, the first printed circuit board having a front side and a rear side separated by a thickness of the first printed circuit board;
an imager disposed at the front side of the first printed circuit board;
wherein the first printed circuit board is attached at the front housing portion with the imager aligned with the lens;
a first electrical connector disposed at the rear side of the first printed circuit board;
wherein the first electrical connector comprises one selected from the group consisting of (i) a plurality of individual electrical pin-receiving socket elements and (ii) a plurality of individual electrical pin elements;
a second printed circuit board having a front side and a rear side separated by a thickness of the second printed circuit board;
wherein the second printed circuit board is disposed at the rear housing portion;
a second electrical connector disposed at the front side of the second printed circuit board;
wherein the second electrical connector comprises another selected from the group consisting of (i) a plurality of individual electrical pin-receiving socket elements and (ii) a plurality of individual electrical pin elements;
wherein the first printed circuit board and the second printed circuit board are juxtaposed and parallel to one another, and wherein the rear side of the first printed circuit board faces the front side of the second printed circuit board;
wherein circuitry of the second printed circuit board is electrically connected to circuitry of the first printed circuit board via electrical connection of the first electrical connector and the second electrical connector made by plug-socket connection of the individual electrical pin elements and corresponding individual electrical pin-receiving socket elements;
a plurality of terminal pins disposed at the rear housing portion;
wherein each terminal pin of the plurality of terminal pins has a first end interior the camera housing and a second end at the connector portion and accessible from exterior the camera housing;
wherein the first ends of the terminal pins electrically connect to respective electrical contacts at the rear side of the second printed circuit board when the rear housing portion is joined with the front housing portion; and
wherein the connector portion of the rear housing portion is configured for connecting to the vehicle wiring connector when the vehicular camera assembly is installed at the vehicle to electrically connect the second ends of the terminal pins to the vehicle wiring connector of the equipped vehicle.

12. The vehicular camera assembly of claim 11, wherein the first electrical connector comprises the plurality of individual electrical pin-receiving socket elements, and wherein the second electrical connector comprises the plurality of individual electrical pin elements.

13. The vehicular camera assembly of claim 11, wherein the first electrical connector comprises the plurality of individual electrical pin elements, and wherein the second electrical connector comprises the plurality of individual electrical pin-receiving socket elements.

14. The vehicular camera assembly of claim 11, wherein the first electrical connector comprises a header connector disposed at the rear side of the first printed circuit board, and wherein the header connector comprises the plurality of individual electrical pin-receiving socket elements, and wherein the second electrical connector comprises the plurality of individual electrical pin elements disposed at the front side of the second printed circuit board.

15. The vehicular camera assembly of claim 11, wherein the plurality of individual electrical pin elements comprise a plurality of individual extendable and retractable electrically conductive pin elements.

16. The vehicular camera assembly of claim 11, wherein the plurality of individual electrical pin elements comprises a plurality of individual spring-loaded pin elements.

17. A vehicular camera assembly, the vehicular camera assembly comprising:
a camera housing comprising a front housing portion and a rear housing portion, wherein the rear housing portion joins the front housing portion, and wherein the front housing portion accommodates a lens, and wherein the rear housing portion comprises a connector portion configured for connecting to a vehicle wiring connector when the vehicular camera assembly is installed at a vehicle;

a first printed circuit board disposed at the front housing portion, the first printed circuit board having a front side and a rear side separated by a thickness of the first printed circuit board;

an imager disposed at the front side of the first printed circuit board;

wherein the first printed circuit board is attached at the front housing portion with the imager aligned with the lens;

a first electrical connector disposed at the rear side of the first printed circuit board;

wherein the first electrical connector comprises a plurality of individual electrical pin-receiving socket elements;

a second printed circuit board having a front side and a rear side separated by a thickness of the second printed circuit board;

a second electrical connector disposed at the front side of the second printed circuit board;

wherein the second electrical connector comprises a plurality of individual electrical pin elements;

wherein the first printed circuit board and the second printed circuit board are juxtaposed and parallel to one another, and wherein the rear side of the first printed circuit board faces the front side of the second printed circuit board;

wherein circuitry of the second printed circuit board is electrically connected to circuitry of the first printed circuit board via electrical connection of the first electrical connector and the second electrical connector made by plug-socket connection of the individual electrical pin elements and corresponding individual electrical pin-receiving socket elements;

a plurality of terminal pins disposed at the rear housing portion;

wherein each terminal pin of the plurality of terminal pins has a first end interior the camera housing and a second end at the connector portion and accessible from exterior the camera housing;

wherein the first ends of the terminal pins electrically connect to respective electrical contacts at the rear side of the second printed circuit board when the rear housing portion is joined with the front housing portion; and wherein the connector portion of the rear housing portion is configured for connecting to the vehicle wiring connector when the vehicular camera assembly is installed at the vehicle to electrically connect the second ends of the terminal pins to the vehicle wiring connector of the equipped vehicle.

18. The vehicular camera assembly of claim 17, wherein the second printed circuit board is disposed at the rear housing portion.

19. The vehicular camera assembly of claim 17, wherein the plurality of individual electrical pin elements comprise a plurality of individual extendable and retractable electrically conductive pin elements.

20. The vehicular camera assembly of claim 17, wherein the plurality of individual electrical pin elements comprises a plurality of individual spring-loaded pin elements.

* * * * *